(12) United States Patent
Iseminger et al.

(10) Patent No.: US 9,174,801 B2
(45) Date of Patent: Nov. 3, 2015

(54) CONVEYOR SYSTEM

(71) Applicant: H & R Industrial, LLC, Kokomo, IN (US)

(72) Inventors: John L. Iseminger, Kokomo, IN (US); Lacy E. Millikan, Sheridan, IN (US)

(73) Assignee: H & R Industrial, LLC, Kokomo, IN (US)

( * ) Notice: Subject to any disclaimer, the term of this patent is extended or adjusted under 35 U.S.C. 154(b) by 0 days.

(21) Appl. No.: 14/208,571

(22) Filed: Mar. 13, 2014

(65) Prior Publication Data

US 2014/0332346 A1    Nov. 13, 2014

Related U.S. Application Data

(60) Provisional application No. 61/778,787, filed on Mar. 13, 2013.

(51) Int. Cl.
*B65G 17/20*    (2006.01)
*B65G 9/00*    (2006.01)

(52) U.S. Cl.
CPC ............... *B65G 9/008* (2013.01); *B65G 9/002* (2013.01); *B65G 17/20* (2013.01)

(58) Field of Classification Search
CPC .......... B65G 17/20; B65G 47/61; B65G 1/08; B65G 65/00; B66F 9/00
USPC ............. 198/468.6, 687.1, 678.1; 193/38, 40; 104/75; 414/595
See application file for complete search history.

(56) References Cited

U.S. PATENT DOCUMENTS

| | | | |
|---|---|---|---|
| 3,603,646 A * | 9/1971 | Leoff | 193/40 |
| 7,578,381 B2 * | 8/2009 | Davidson | 198/370.04 |
| 8,562,276 B2 * | 10/2013 | Helmner | 414/345 |
| 2004/0178048 A1 * | 9/2004 | Ursitti | 198/678.1 |
| 2008/0173208 A1 * | 7/2008 | Heinrich | 104/75 |

* cited by examiner

*Primary Examiner* — James R Bidwell
(74) *Attorney, Agent, or Firm* — Ice Miller LLP

(57) ABSTRACT

A conveyor system is provided including a rail having a starting block at a first end and a stopper at a second end. A coaster assembly is configured to travel along the rail. The coaster assembly includes an upper bearing that engages a top of the rail and a side bearing that engages a side of the rail. A parts delivery device is attached to the coaster assembly.

20 Claims, 44 Drawing Sheets

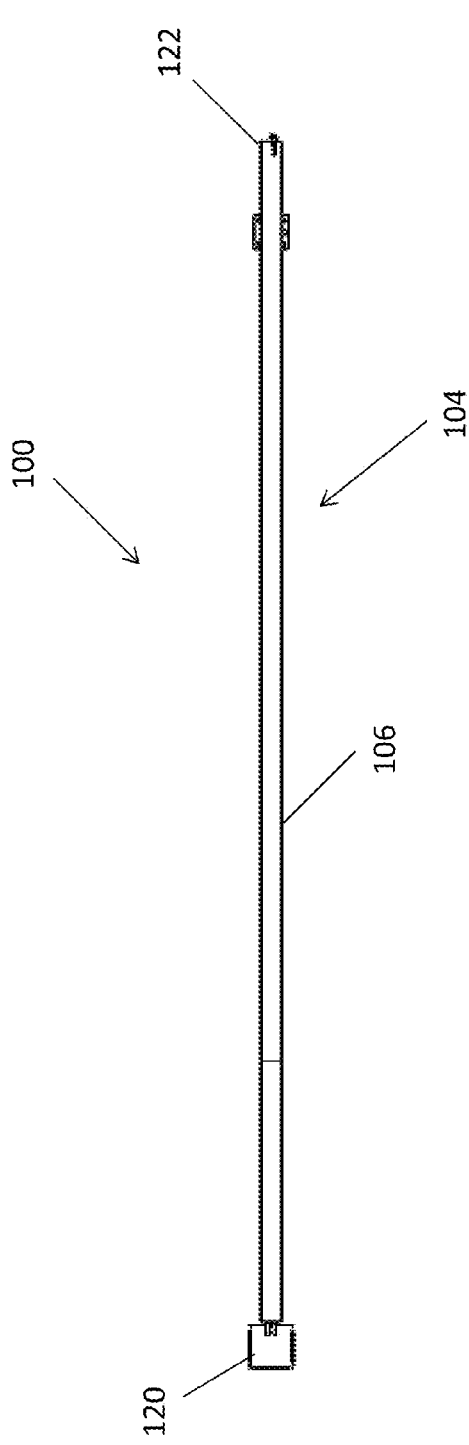
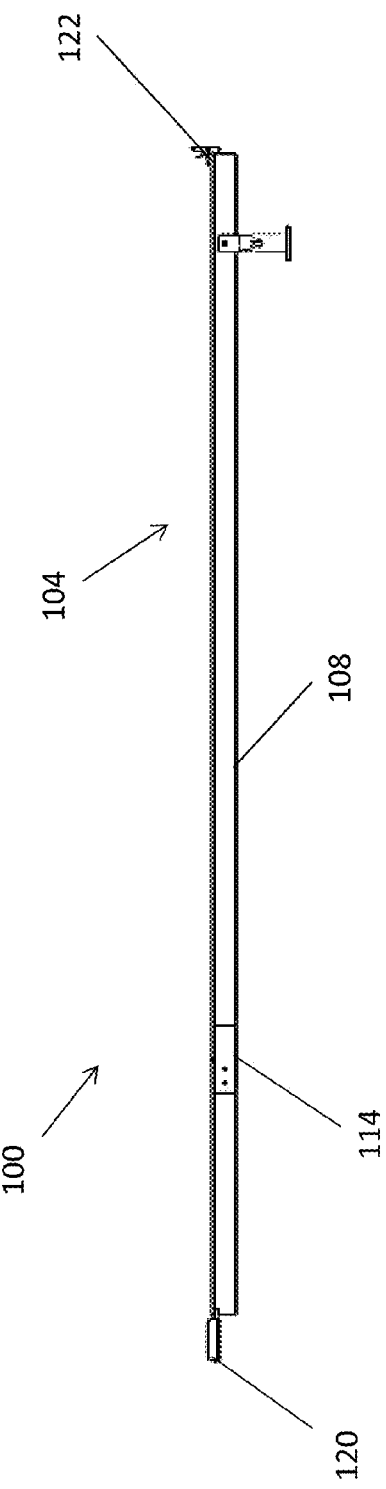
FIG. 2A
FIG. 2B

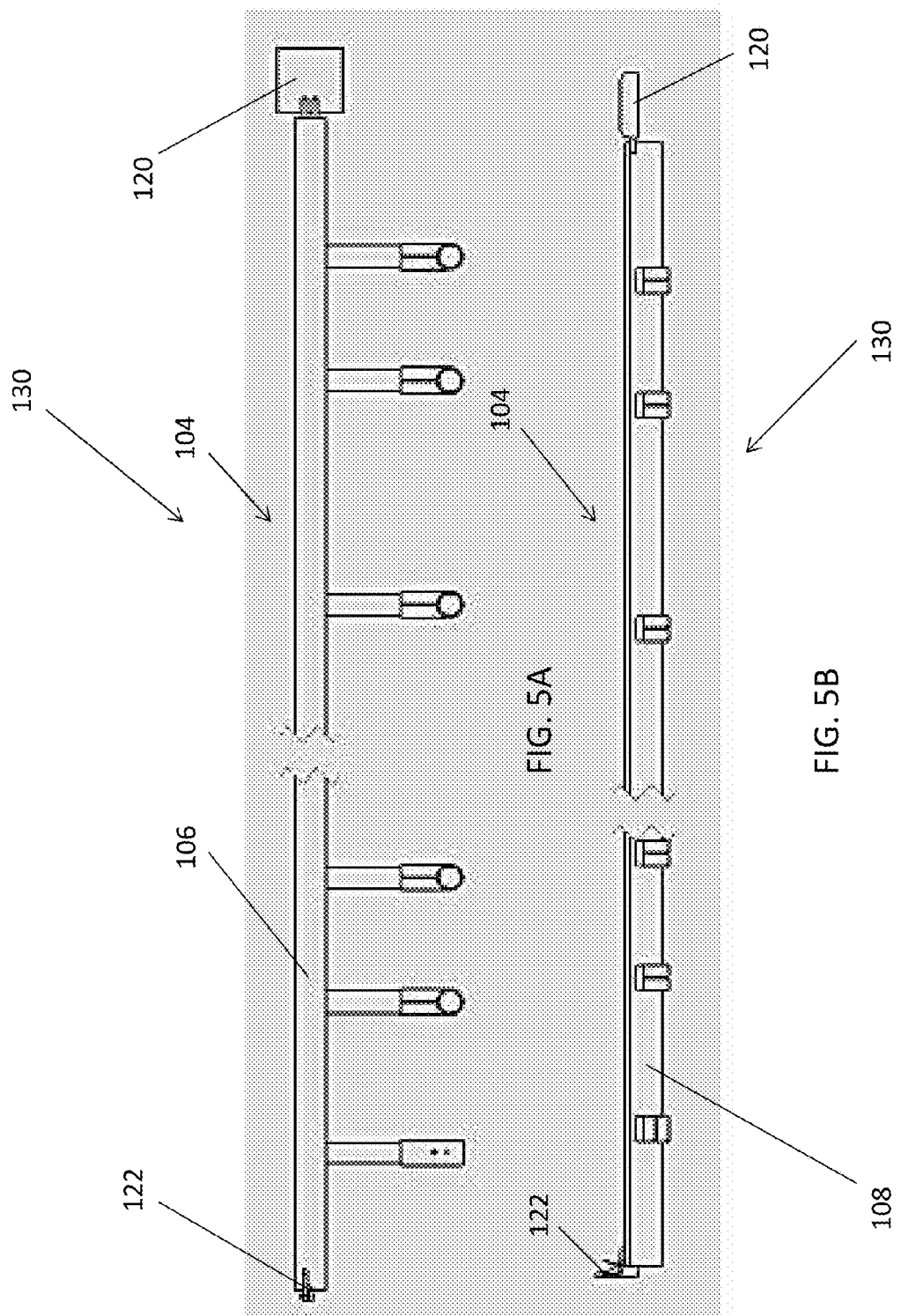

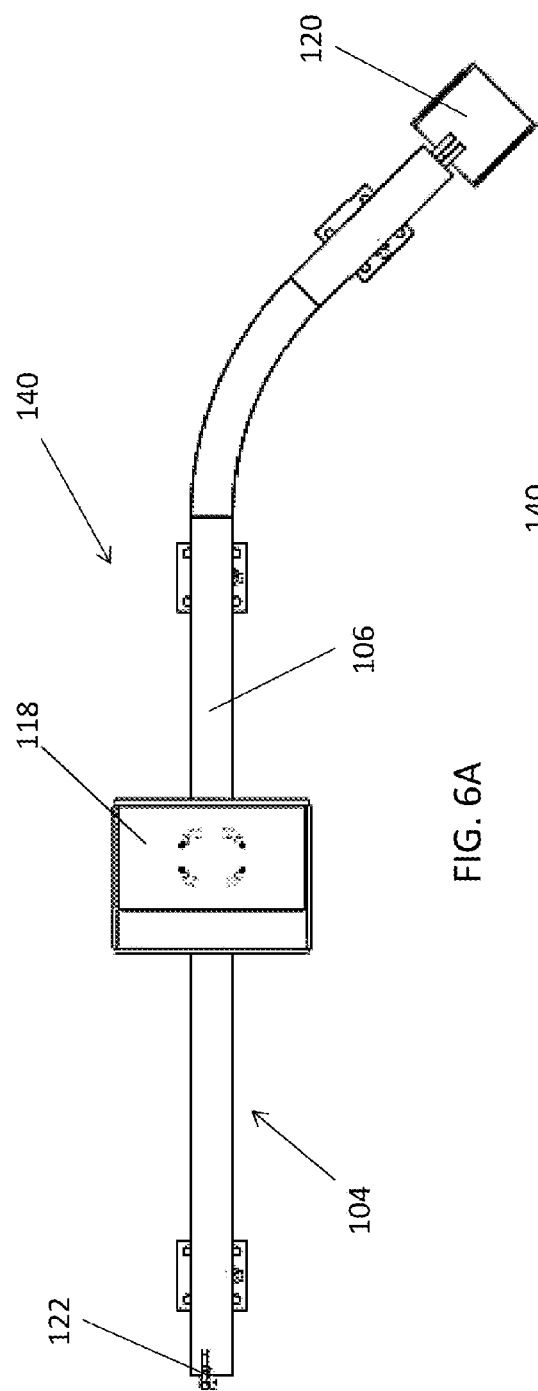
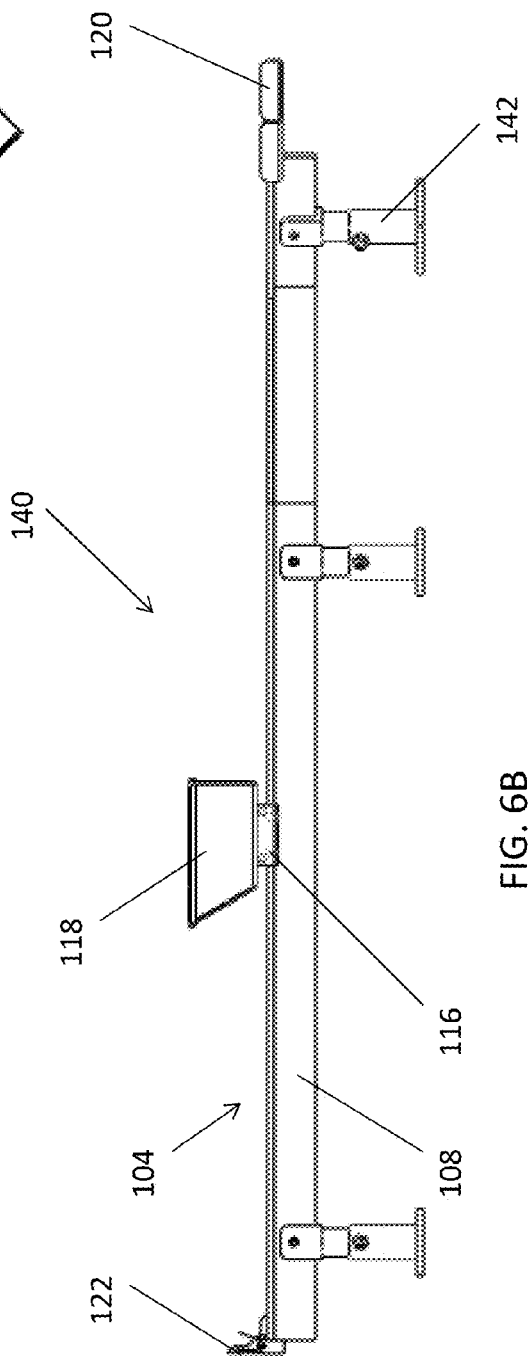
FIG. 6A
FIG. 6B

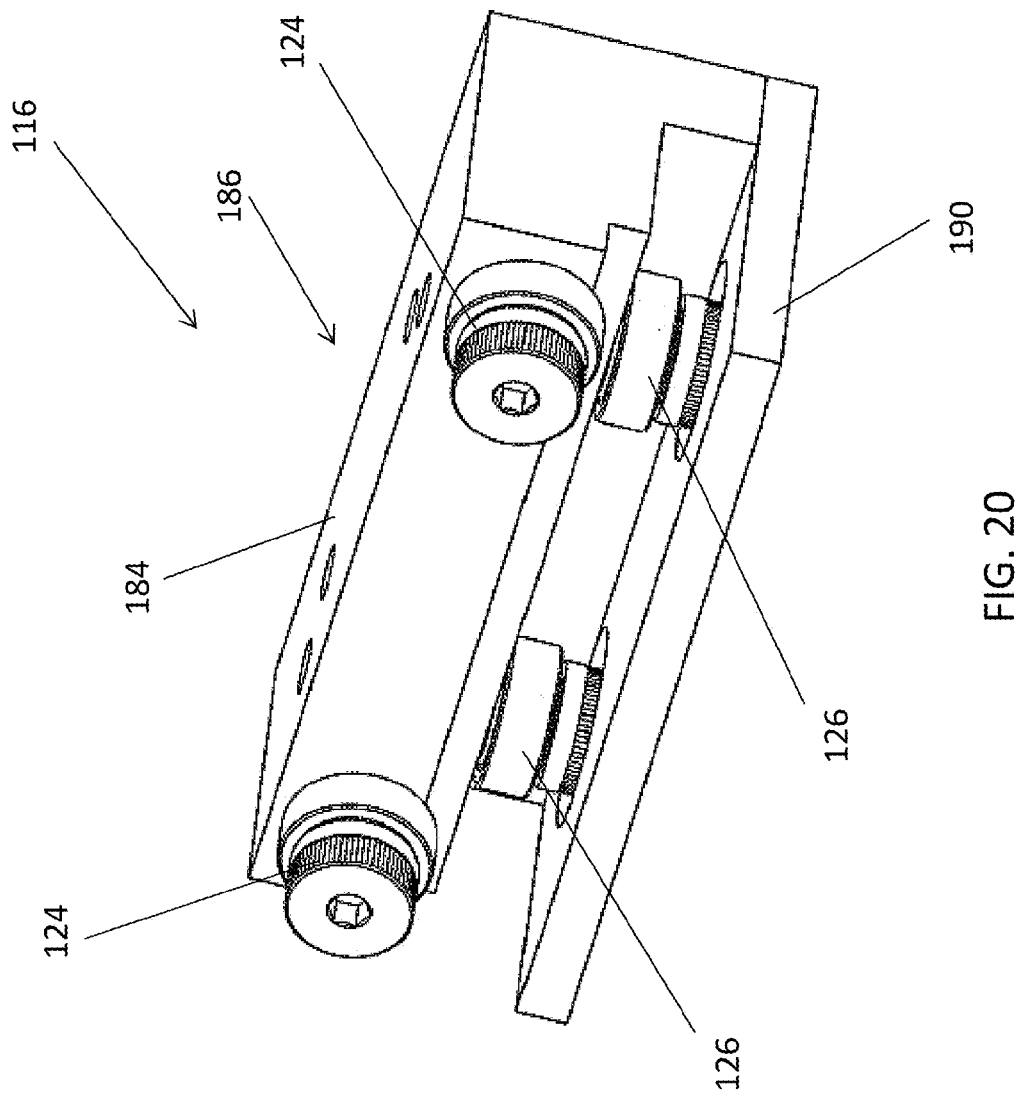

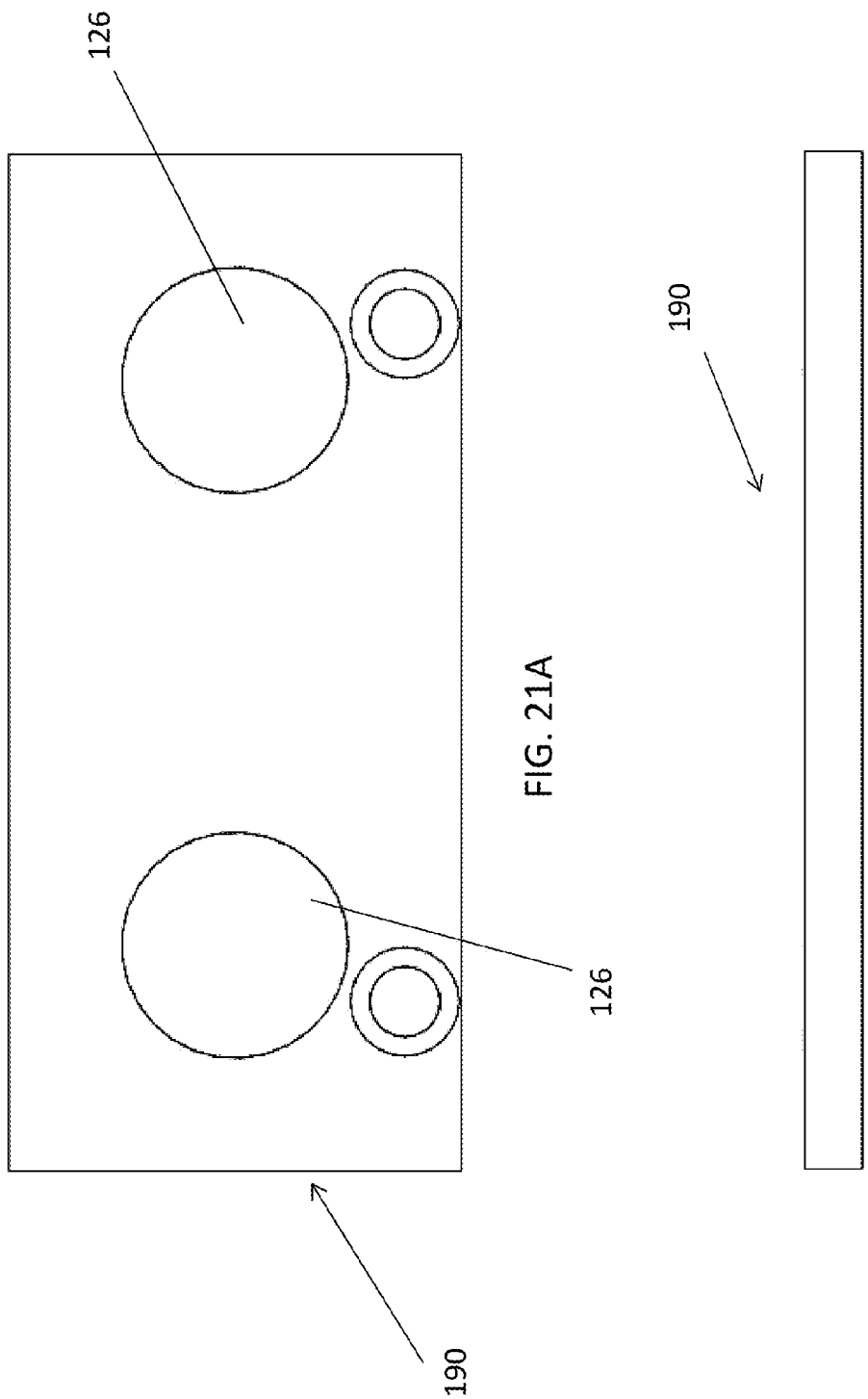

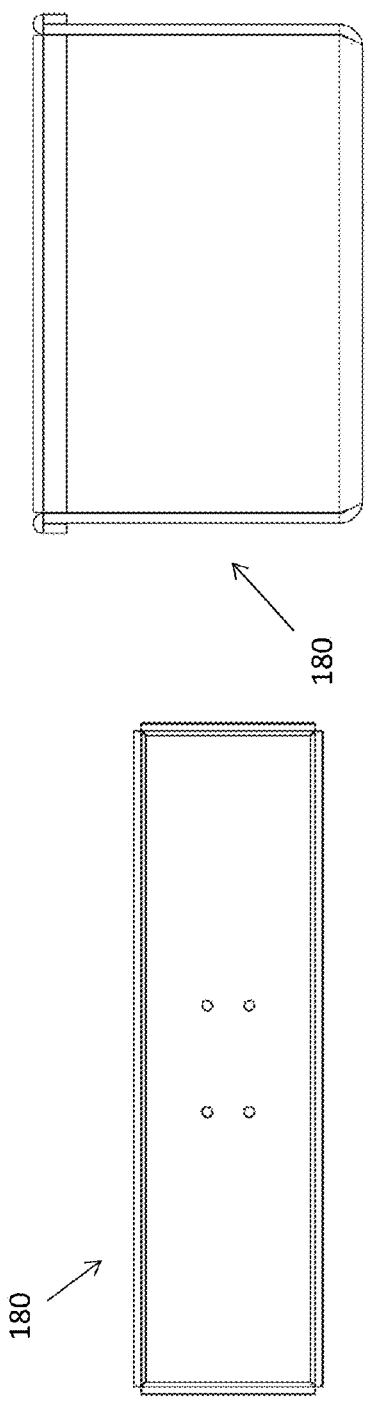
FIG. 22A
FIG. 22C
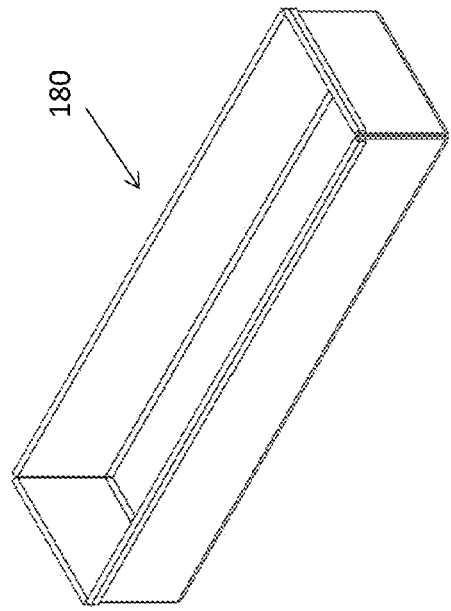
FIG. 22B
FIG. 22D

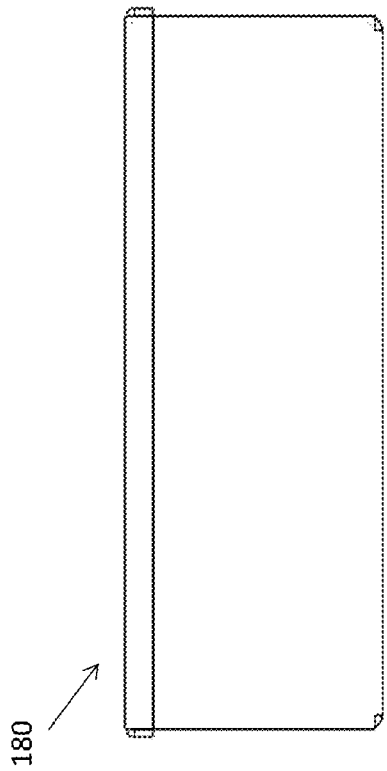
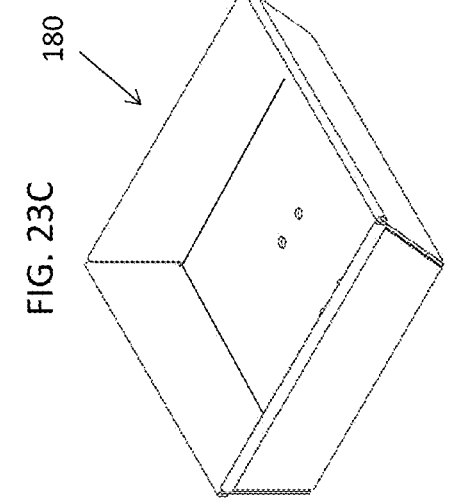
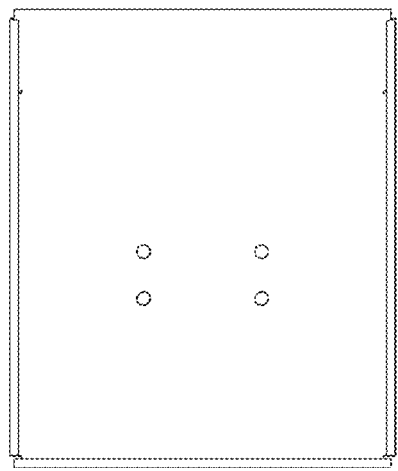
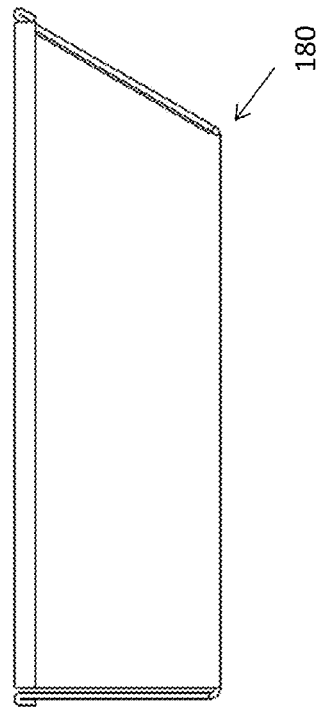

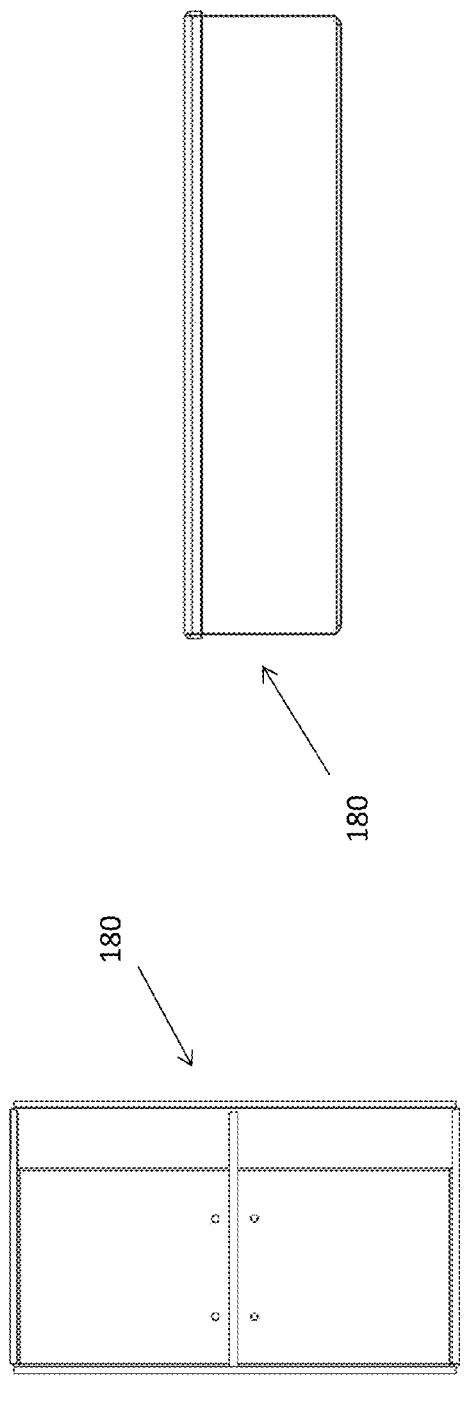
FIG. 26A
FIG. 26B
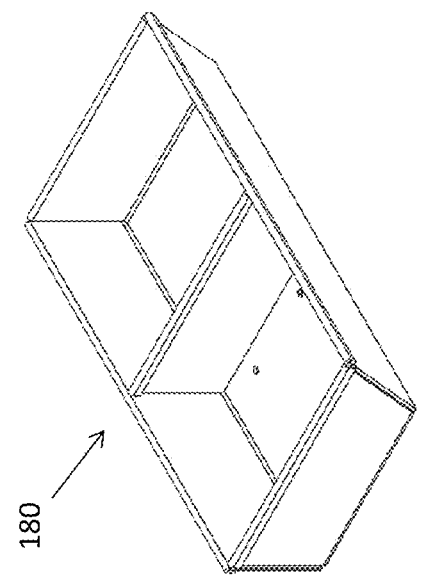
FIG. 26C
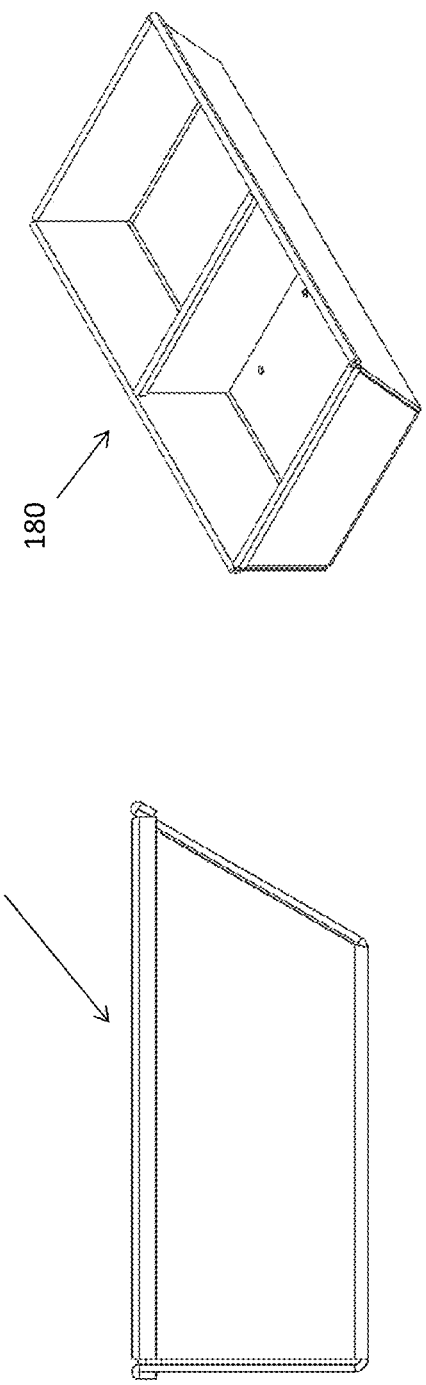
FIG. 26D

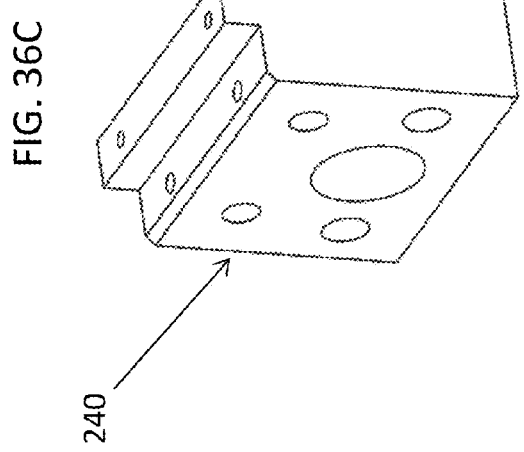
FIG. 36C
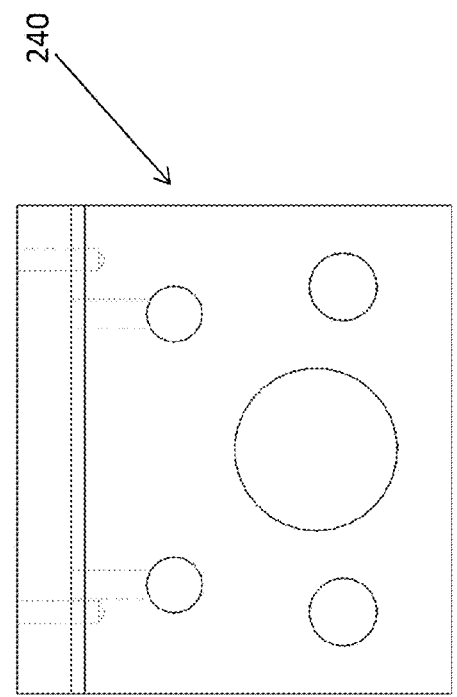
FIG. 36D
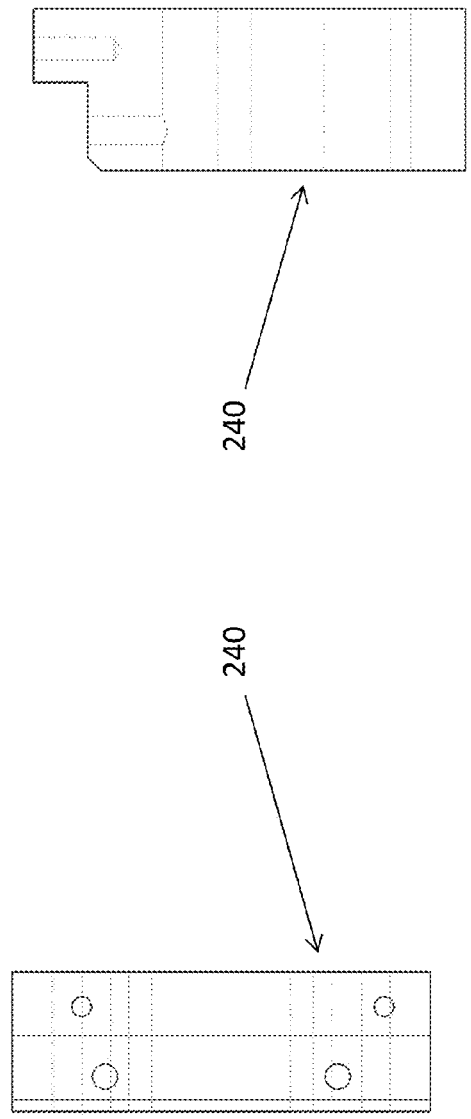
FIG. 36A
FIG. 36B

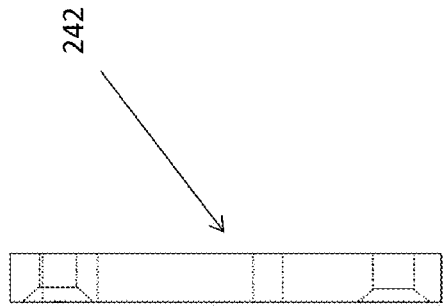
FIG. 37C
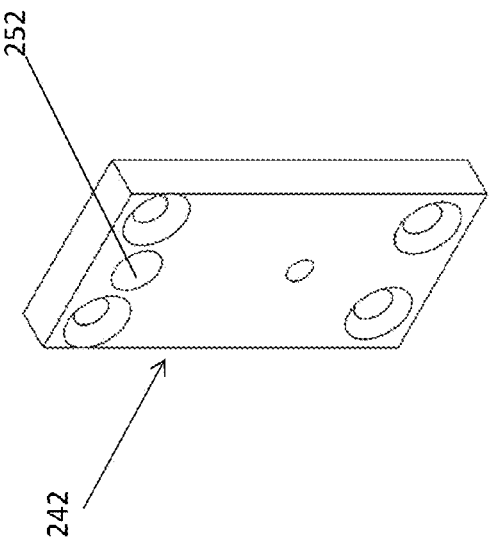
FIG. 37D
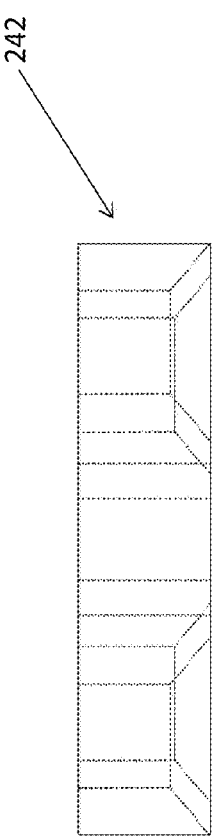
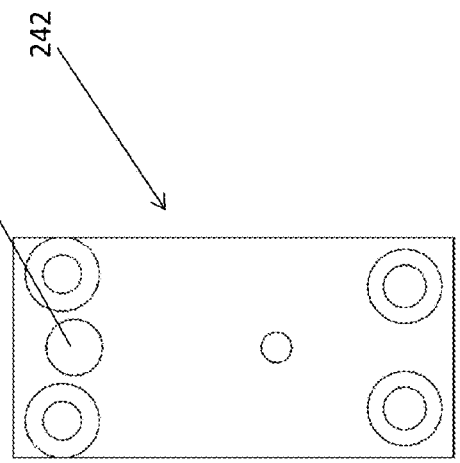
FIG. 37A
FIG. 37B

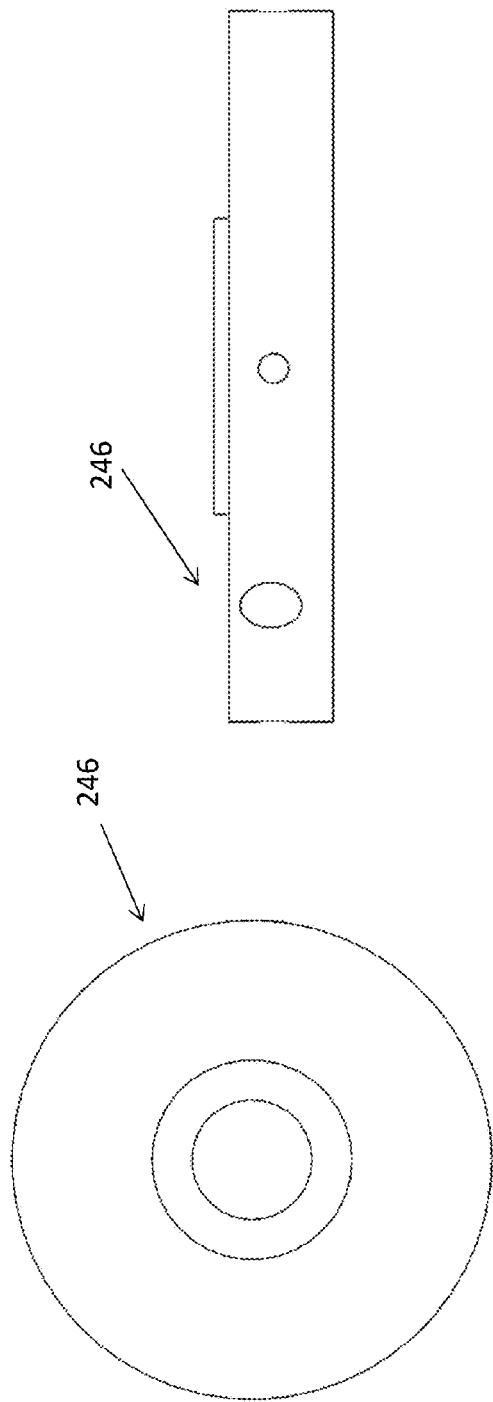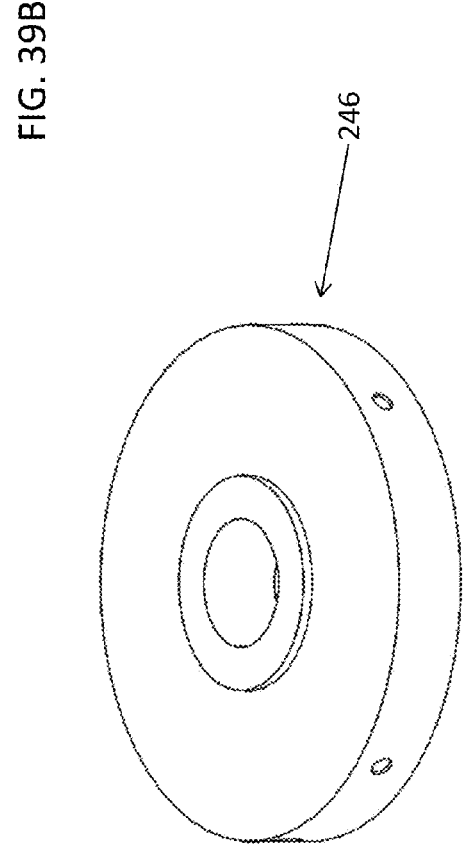
FIG. 39A
FIG. 39B
FIG. 39C

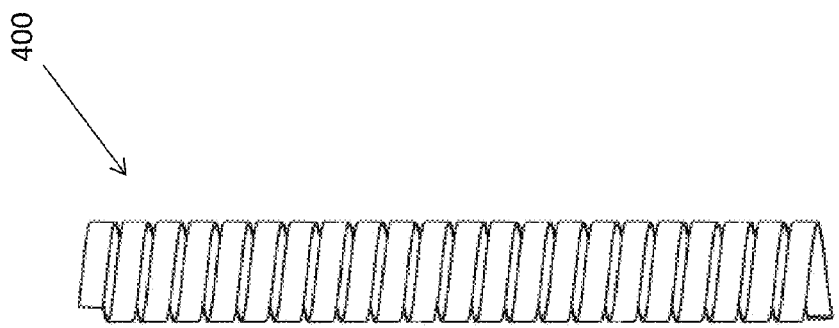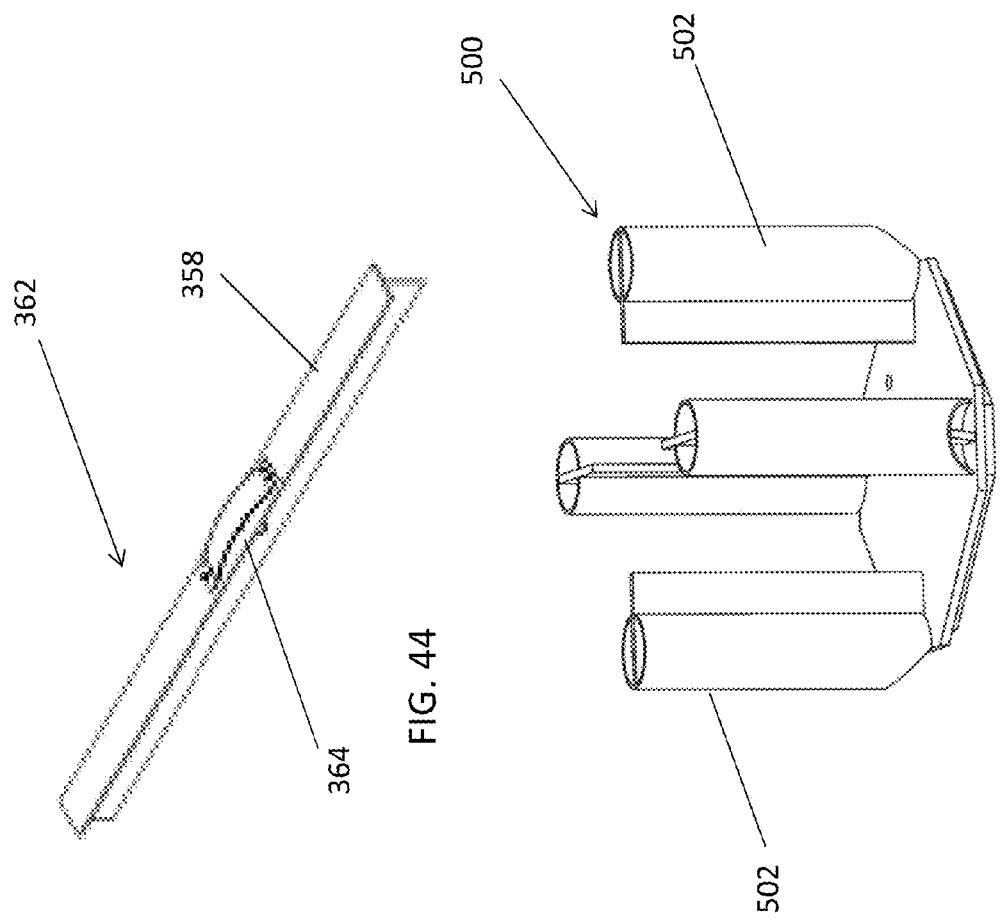

CONVEYOR SYSTEM

CROSS-REFERENCE TO RELATED APPLICATIONS

The present application is a non-provisional patent application claiming priority to U.S. Provisional Patent Application No. 61/778,787 filed Mar. 13, 2013 and having the title "CONVEYOR SYSTEM", which is herein incorporated in its entirety.

BACKGROUND

Assembly lines and/or machining stations generally require parts to be regularly delivered to individuals working on the assembly line and/or machining station. Some assembly lines and/or machining stations utilize runners to hand deliver parts to the individuals working on the line. Unfortunately, it may become time consuming to hand deliver parts to each station of the assembly line and/or machining station. Additionally, hand delivery may be dangerous as the assembly line and/or machining station often includes multiple movable parts which can be hazardous to individuals walking the assembly line and/or machining station floor. Some assembly lines and/or machining stations use conveyor systems to deliver the parts from a delivery path to the assembly line and/or machining station. Many of these conveyor systems are bulky and require multiple moveable parts. Accordingly, these systems require a substantial amount of space and may be subject to maintenance needs. As such, these systems are undesirable, as space is at a premium in assembly facilities and assembly lines and/or machining stations cannot be regularly shut down for maintenance.

Accordingly, there is a need for a conveyor system that can be installed or retrofit in an assembly facility without eliminating a substantial amount of space on the assembly line and/or machining station floor.

Another need remains for a conveyor system that has a limited number of movable parts.

SUMMARY

In at least one embodiment, a conveyor system for an assembly line and/or machining station is provided having a planar rail upon which a coaster assembly glides from a starting block to a stopper. The starting block aligns the upper bearings with the top of the rail and the side bearings with the side of the rail. The stopper is moveable to allow the coaster assembly to be removed from the planar rail. The rail declines from the starting block to the stopper. In at least one embodiment, the rail includes at least one curve. The coaster assembly includes upper bearings that engage a top of the planar rail and side bearings that engage each side of the planar rail. The coaster assembly may also include a toggle clamp to engage the rail when closed to prevent movement of the coaster assembly along the rail. A parts delivery device is attached to the coaster assembly to retain parts for the assembly line and/or machining station. The parts delivery device is at least one of a tray or a hook, and the coaster assembly may include a swivel to alter a position of the parts delivery device on the coaster assembly.

BRIEF DESCRIPTION OF THE DRAWINGS

The embodiments described herein and other features, advantages and disclosures contained herein, and the manner of attaining them, will become apparent and the present disclosure will be better understood by reference to the following description of various exemplary embodiments of the present disclosure taken in conjunction with the accompanying drawing, wherein:

FIG. 2A is a top schematic view of the portion of the conveyor system shown in FIG. 1. FIG. 2B is a side schematic view of the portion the conveyor system shown in FIG. 1.

FIG. 5A is a top schematic view of a portion of a conveyor system formed in accordance with at least one embodiment. FIG. 5B is a side schematic view of the portion of the conveyor system shown in FIG. 5A.

FIG. 6A is a top schematic view of a table top conveyor system formed in accordance with at least one embodiment. FIG. 6B is a side schematic view of the table top conveyor system shown in FIG. 6A.

FIG. 20 is a perspective view of a portion of the coaster assembly shown in FIG. 19.

FIG. 21A is a top view of a side bearing assembly formed in accordance with at least one embodiment. FIG. 21B is a side view of a side bearing assembly shown in FIG. 21A.

FIG. 22A is a top view of a tray formed in accordance with at least one embodiment. FIG. 22B is a front view of the tray shown in FIG. 22A. FIG. 22C is a side view of the tray shown in FIG. 22A. FIG. 22D is a top perspective view of the tray shown in FIG. 22A.

FIG. 23A is a top view of a tray formed in accordance with at least one embodiment. FIG. 23B is a side view of the tray shown in FIG. 23A. FIG. 23C is a top view of the tray shown in FIG. 23A. FIG. 23D is a top perspective view of the tray shown in FIG. 23A.

FIG. 26A is a top view of a tray formed in accordance with at least one embodiment. FIG. 26B is a side view of the tray shown in FIG. 26A. FIG. 26C is a front view of the tray shown in FIG. 26A. FIG. 26D is a top perspective view of the tray shown in FIG. 26A.

FIG. 36A is a top view of a portion of a coaster bearing assembly formed in accordance with at least one embodiment. FIG. 36B is a front view of a coaster bearing assembly shown in FIG. 36A. FIG. 36C is a side view of the coaster bearing assembly shown in FIG. 36A. FIG. 36D is a top perspective view of the coaster bearing assembly shown in FIG. 36A.

FIG. 37A is a side view of a portion of a coaster bearing assembly formed in accordance with at least one embodiment. FIG. 37B is a top view of a coaster bearing assembly shown in FIG. 37A. FIG. 37C is a front view of the coaster bearing assembly shown in FIG. 37A. FIG. 37D is a top perspective view of the coaster bearing assembly shown in FIG. 37A.

FIG. 39A is a top view of a coaster assembly swivel formed in accordance with at least one embodiment. FIG. 39B is a side view of the coaster assembly swivel shown in FIG. 39A. FIG. 39C is a top perspective view of the coaster assembly swivel shown in FIG. 39A.

FIG. 44 is a side view of a rail formed in accordance with at least one embodiment.

FIG. 45 is a side perspective view of a rail formed in accordance with at least one embodiment.

FIG. 46 is a top perspective view of a coaster assembly formed in accordance with at least one embodiment.

DETAILED DESCRIPTION

Figure 1:
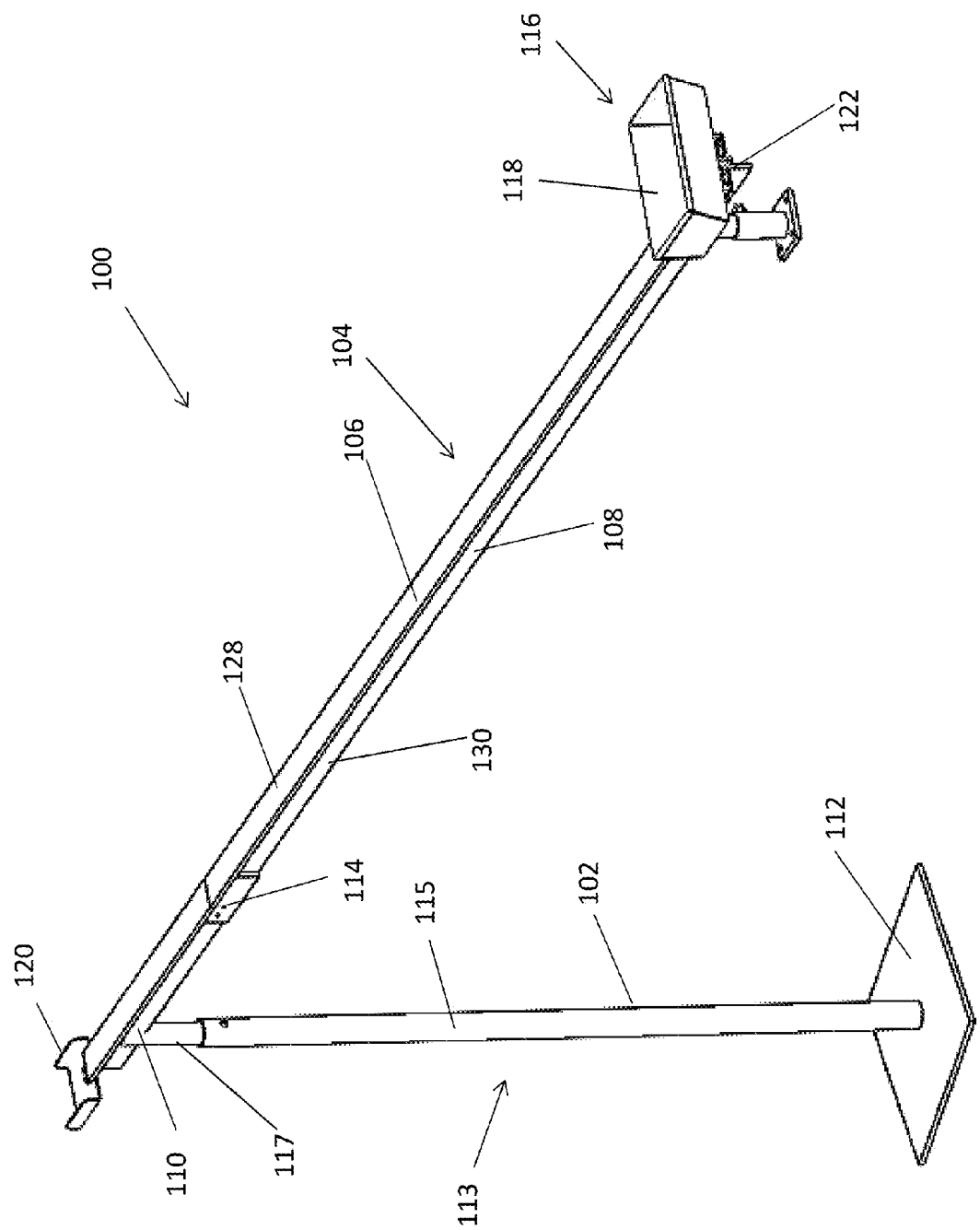
FIG. 1 is a perspective view of a portion of a conveyor system formed in accordance with at least one embodiment.

The features and advantages of this disclosure, and the manner of attaining them, will be more apparent and better understood by reference to the following descriptions of the disclosed methods and systems, taken in conjunction with the accompanying drawings. The components in the figures are not necessarily to scale, emphasis instead being placed upon illustrating the principles of the disclosure. Moreover, in the figures like referenced numerals designate corresponding parts throughout the different views, but not all reference numerals are shown in each of the figures.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Figure 18C:
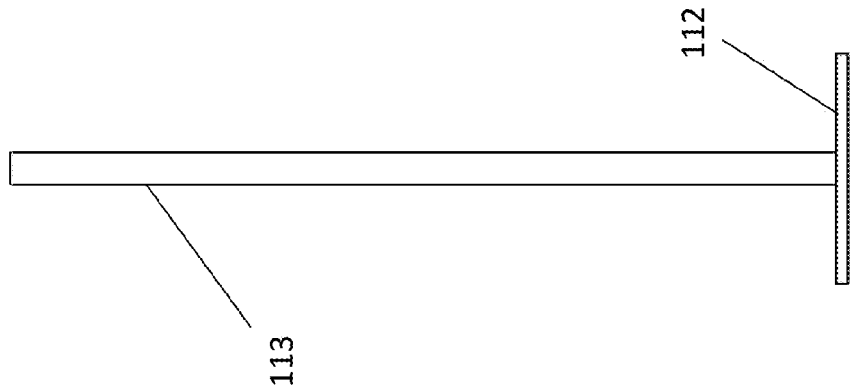
FIG. 18C is a side view of the post shown in FIG. 18A.
Figure 18B:
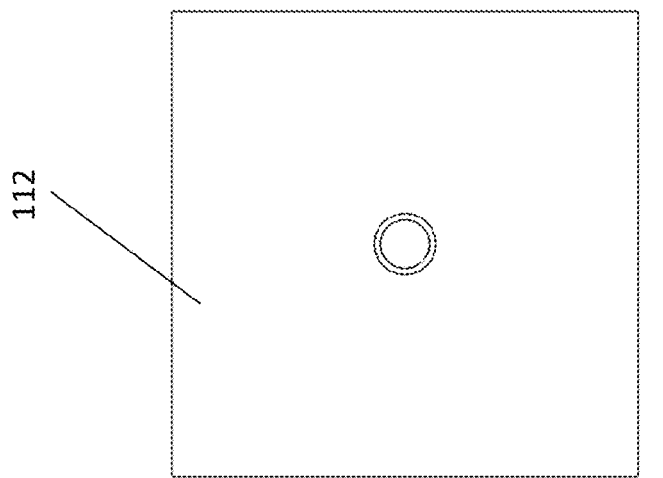
FIG. 18B is a top view of the base shown in FIG. 18A.
Figure 18A:
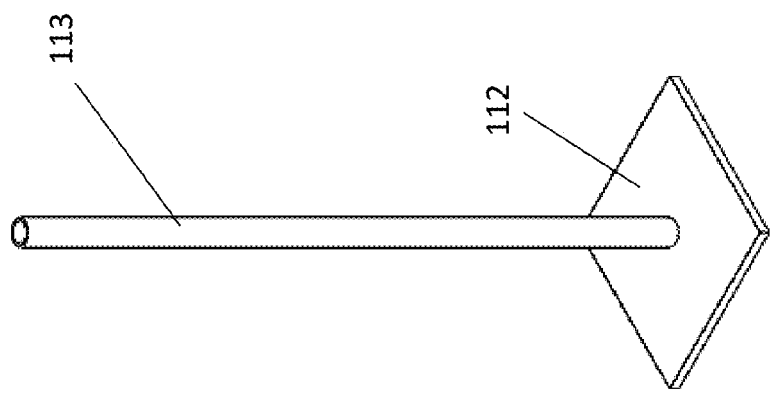
FIG. 18A is a side perspective view of a stand formed in accordance with at least one embodiment.

Disclosed herein is a conveyor system for delivering parts to an assembly line and/or machining station. FIGS. 1-6 illustrate various embodiments of the conveyor system. In particular, FIGS. 1 and 2 illustrate a portion of a conveyor system 100 that is mounted on floor stands 102 (shown in FIG. 18). The conveyor system 100 includes a planar rail 104 including a horizontal rail 106 and a vertical rail 108. The horizontal rail 106 and the vertical rail 108 include planar surfaces. The horizontal rail 106 is positioned substantially perpendicular to the vertical rail 108 in a T-shape. Clamps 110 at the top of the floor stands 102 are attached to the vertical rail 108 to support the planar rail 104. The clamps 110 may be welded, bolted, or otherwise attached to the vertical rail 108. Referring to FIG. 18, the floor stands 102 are balanced with a base 112 that may be free standing or bolted to the ground. A telescoping post 113 extends from the base 112. The telescoping post 113 includes a first telescoping section 115 and a second telescoping section 117 that is positioned within the first telescoping section 115 and extends and retracts therefrom to adjust a height of the floor stand 102. The clamp 110 is attached to an end of the second telescoping section 117.

Referring back to FIGS. 1 and 2, sections of the planar rail 104 may be joined together with a joint 114 to form an elongated conveyor system 100. The joints 114 join the sections together along the vertical rail 108. Neither the joints 114 nor the clamps 110 are joined to the horizontal rail 106, thereby leaving the horizontal rail 106 unencumbered so that the horizontal rail 106 may receive a coaster assembly 116 having a parts delivery device 118 attached thereto (shown in more detail in FIG. 19). The coaster assembly 116 glides along the horizontal rail 106 from a starting block 120 to a stopper 122. In particular, the coaster assembly 116 includes upper bearings 124 (shown in FIG. 20) and side bearings 126 (shown in FIG. 20) that engage a top 128 of the horizontal rail 106 and a side 130 of the horizontal rail 106, respectively, to guide the coaster assembly 116 along the horizontal rail 106. In at least one embodiment, the planar rail 104 is angled at a decline from the starting block 120 towards the stopper 122 to aid the movement of the coaster assembly 116 with gravity.

Figure 7:
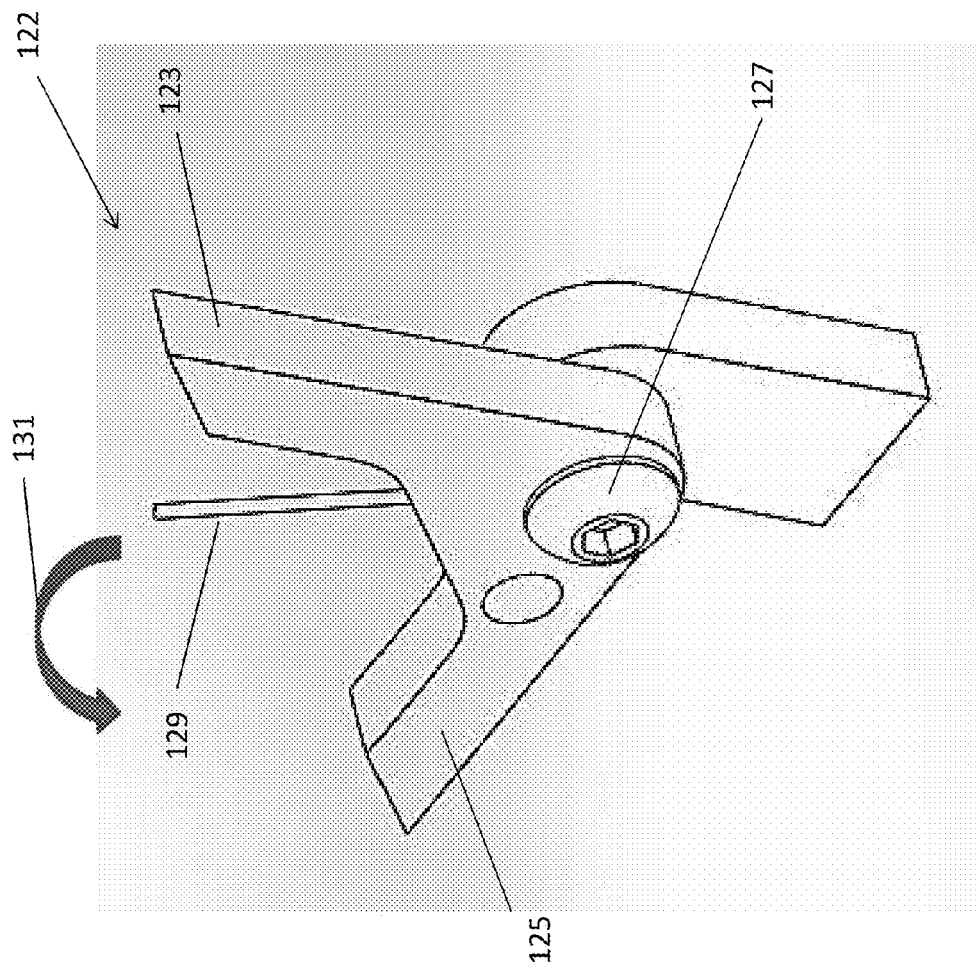
FIG. 7 is a perspective view of a stopper formed in accordance with at least one embodiment.
Figure 8:
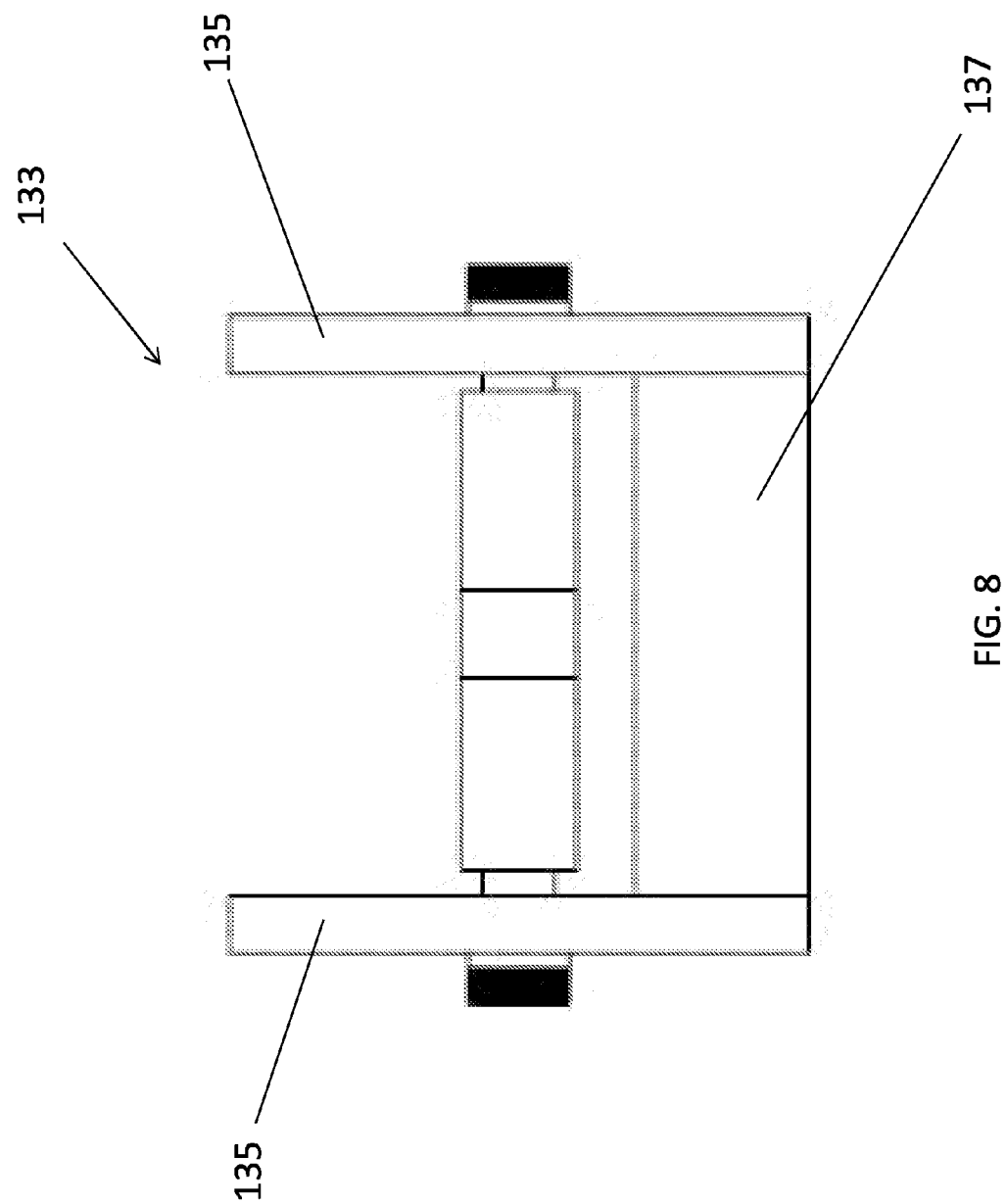
FIG. 8 is a perspective view of a stopper formed in accordance with at least one embodiment.

Referring to FIG. 7, the stopper 122 includes a stopping end 123 attached to an actuating end 125. A hinge 127 allows the stopper 122 to be rotated and a spring 129 returns the stopper 122 to a stopping position. In the stopping position, the coaster assembly 116 engages the stopping end 123 at the end of the planar rail 104. The actuating end 125 is then manipulated to rotate the stopping end 123 in the direction of arrow 131 to enable the coaster assembly 116 to be removed from the planar rail 104. FIG. 8 illustrates an embodiment of a stopper 133 having two stopping ends 135 joined by an actuating plate 137.

Figure 9:
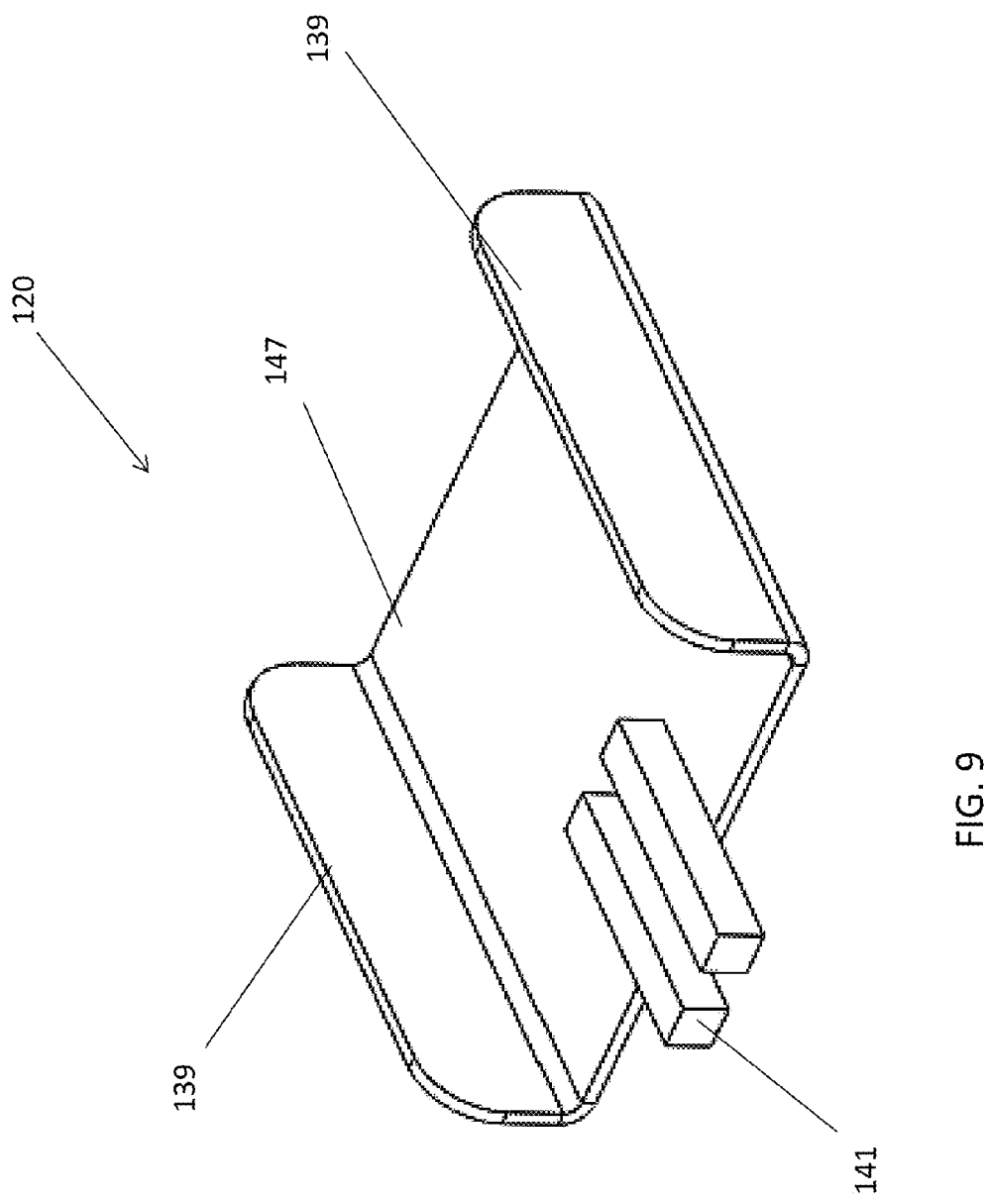
FIG. 9 is a perspective view of a starting block formed in accordance with at least one embodiment.
Figure 10:
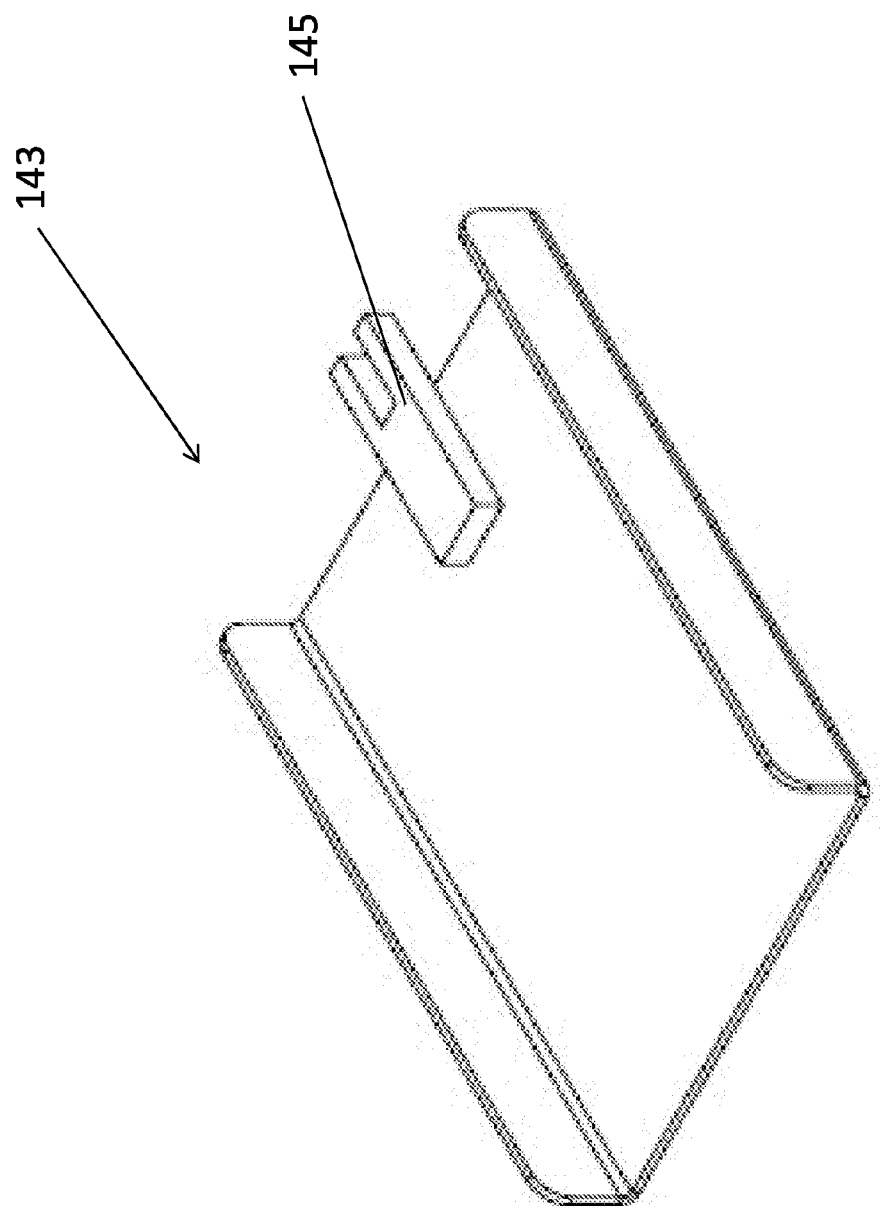
FIG. 10 is a perspective view of a starting block formed in accordance with at least one embodiment.

Referring to FIG. 9, the starting block 120 includes a base 147 and two ends 139 extending from the base 147. The coaster assembly 116 is positioned between the two ends 139 and aligned with the planar rail 104 via a pair of alignment mechanisms 141. FIG. 10 illustrates a starting block 143 having a single alignment mechanism 145.

An assembly facility may include multiple conveyor systems 100. In particular, the assembly facility may include a delivery conveyor system 100 that delivers parts from a delivery path of the assembly facility to the assembly line and/or machining station, and a return conveyor system 100 that returns the parts delivery device 118 from the assembly line and/or machining station to the delivery path. Other embodiments may include more than one delivery conveyor system 100 and/or more than one return conveyor system 100.

Figure 3:
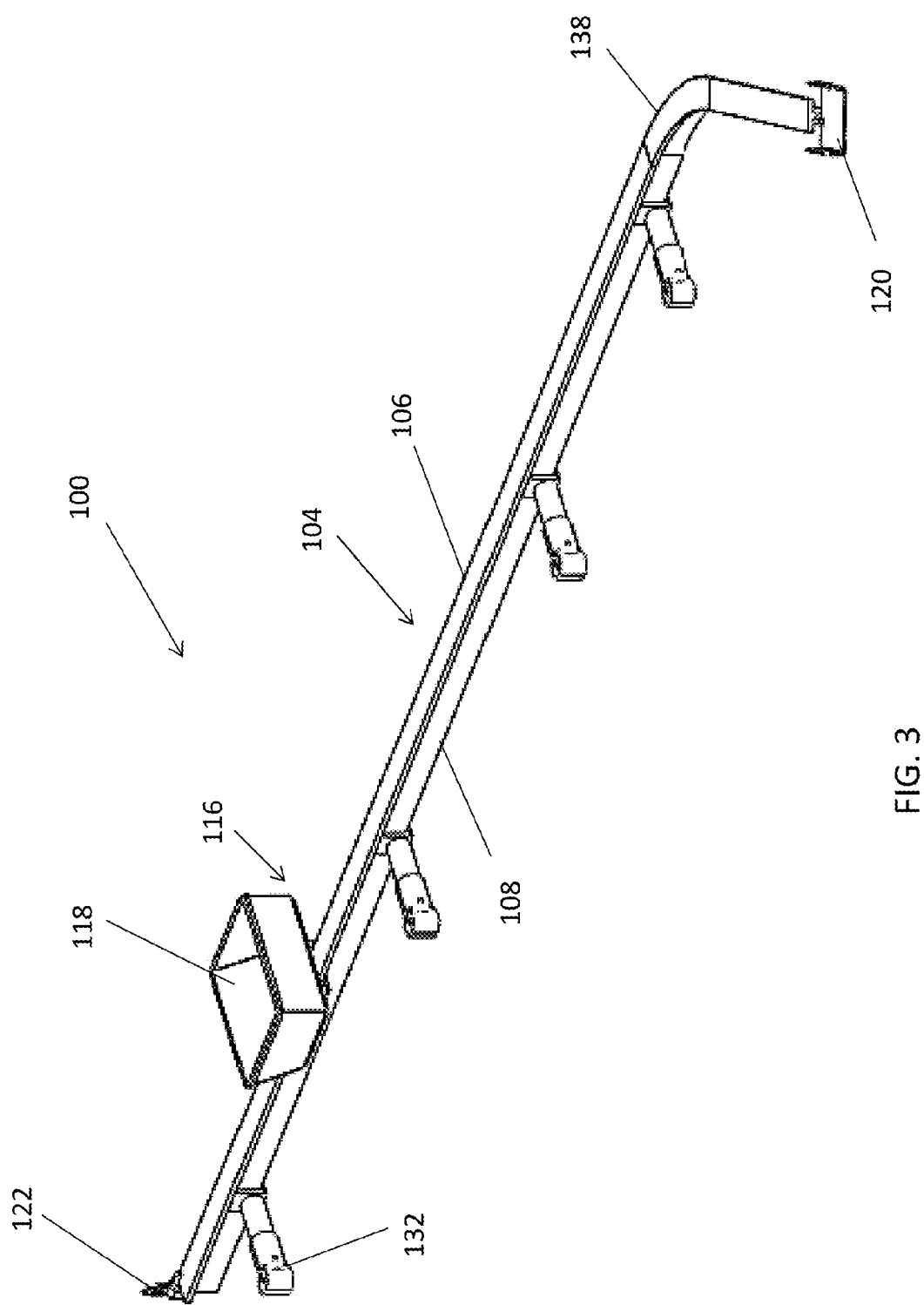
FIG. 3 is a perspective view of a portion of a conveyor system formed in accordance with at least one embodiment.
Figure 4A:
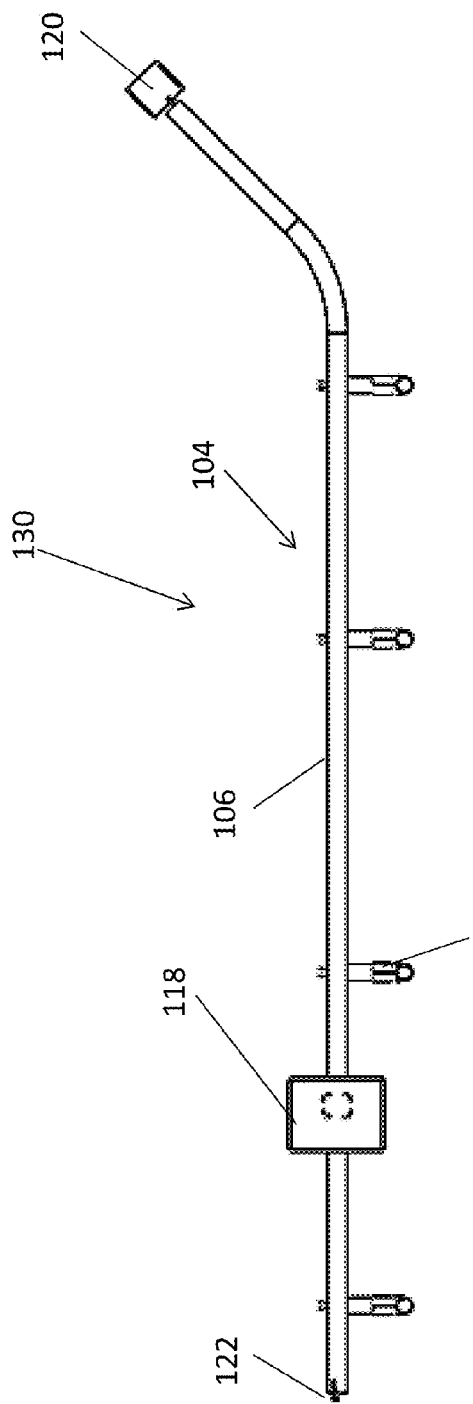
FIG. 4A is a top schematic view of the portion of the conveyor system shown in FIG. 3.
Figure 4B:
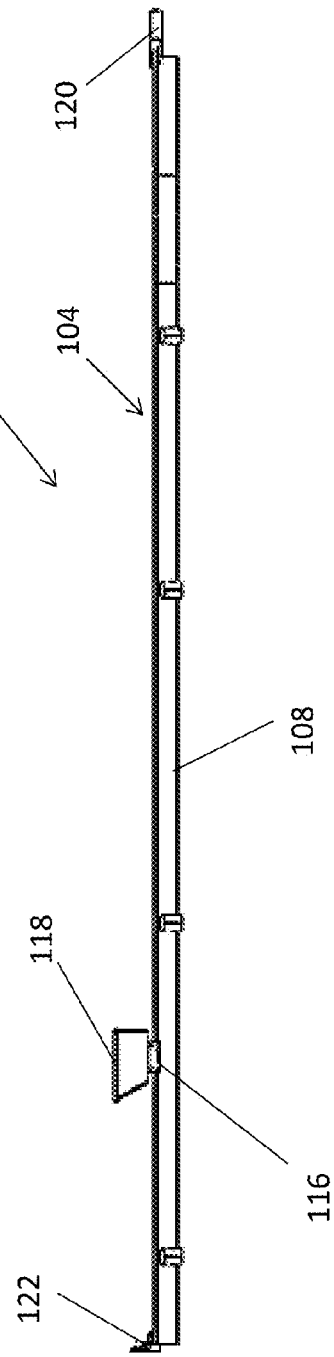
FIG. 4B is a side schematic view of the portion of the conveyor system shown in FIG. 3.
Figure 13:
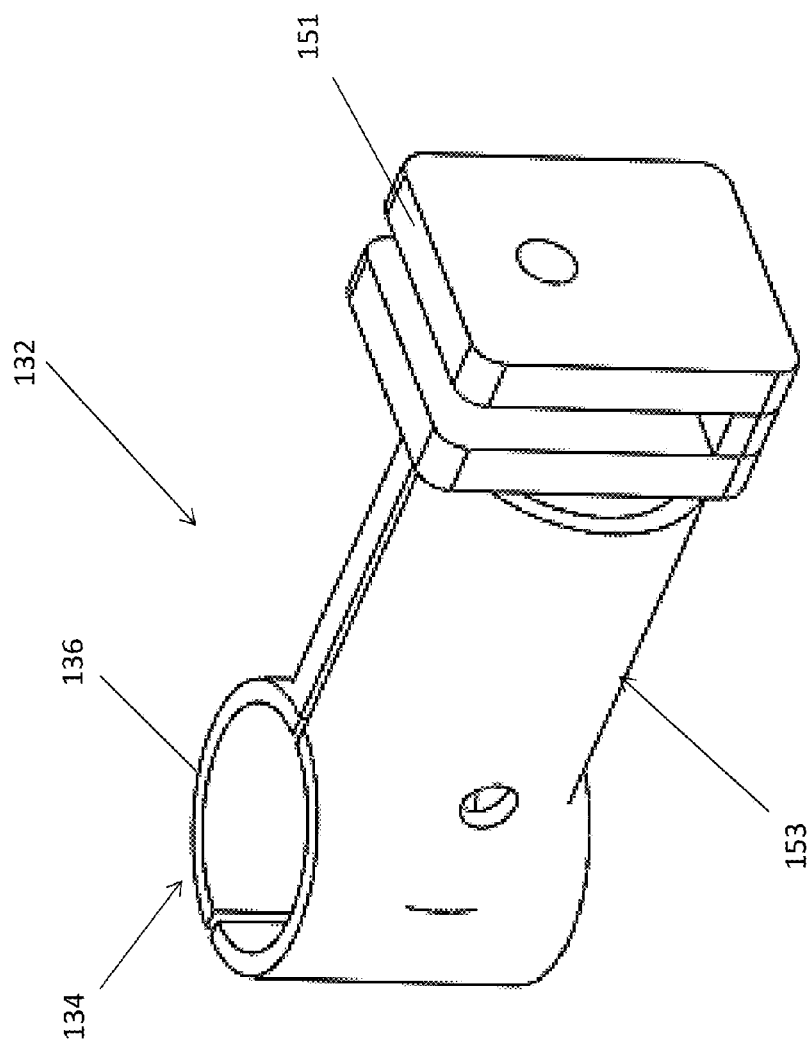
FIG. 13 is a perspective view of a frame mount formed in accordance with at least one embodiment.
Figure 14:
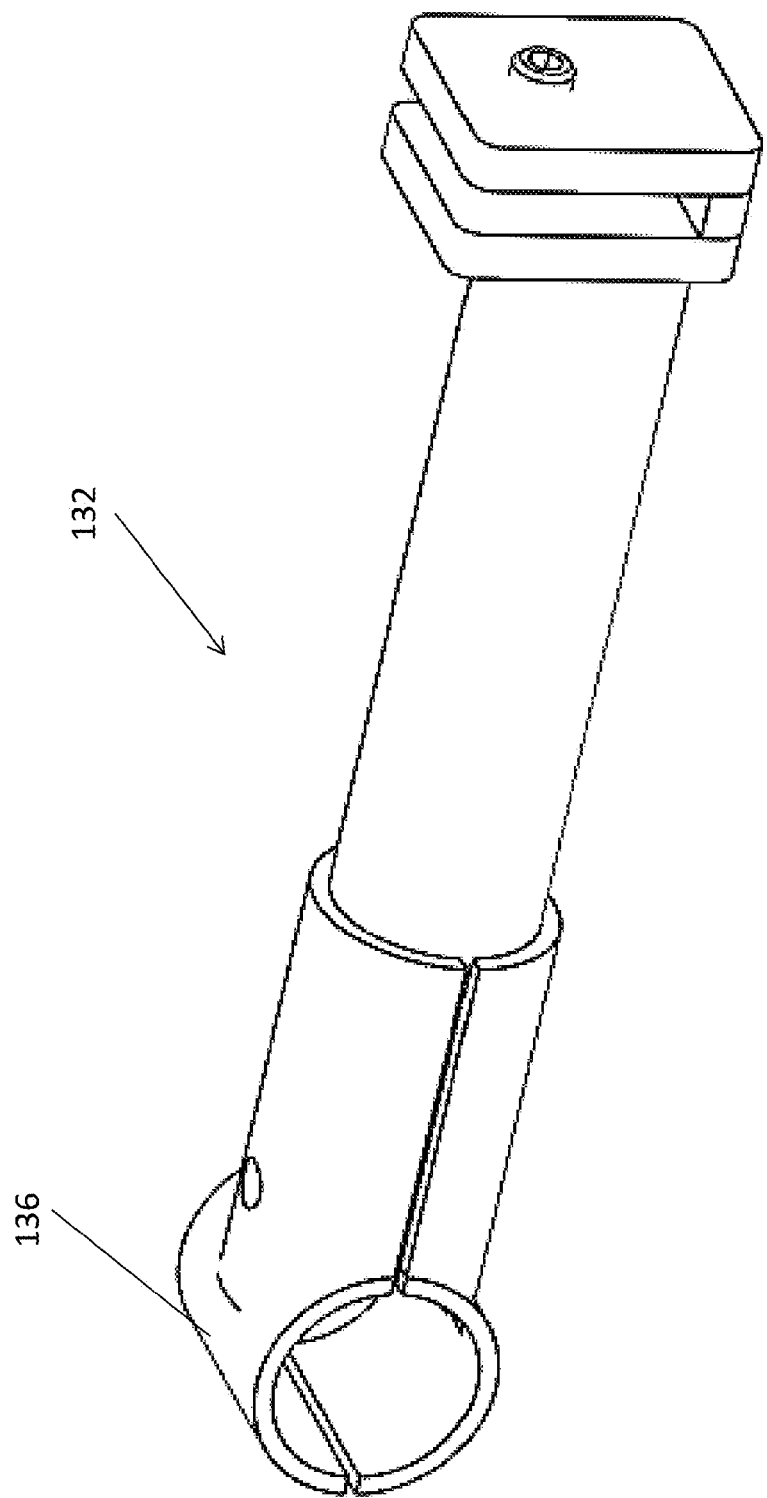
FIG. 14 is a perspective view of a frame mount formed in accordance with at least one embodiment.

FIGS. 3-5 illustrate a portion of a conveyor system 130 that is configured to be attached to an existing structure via mounts 132 (show in more detail in FIG. 13). The conveyor system 130 includes a planar rail 104 that is supported at the vertical rail 108 by the mounts 132. Referring to FIG. 13, a support end 134 of the mount 132 includes a clamp 136 that is secured around an existing pipe or tubular structure (not shown). A clamp 151 is positioned on the vertical rail 108 to secure the planar rail 104 to the mount 132. A telescoping arm 153 enables the distance between the clamp 136 and the clamp 151 to be adjusted. In FIG. 13 the clamp 136 is positioned to secure to a vertical pipe (not shown). FIG. 14 illustrates the clamp 136 positioned to secure to a horizontal pipe (not shown). Alternatively, the clamp 136 may be rotated to join to an angled pipe (not shown).

Figure 11:
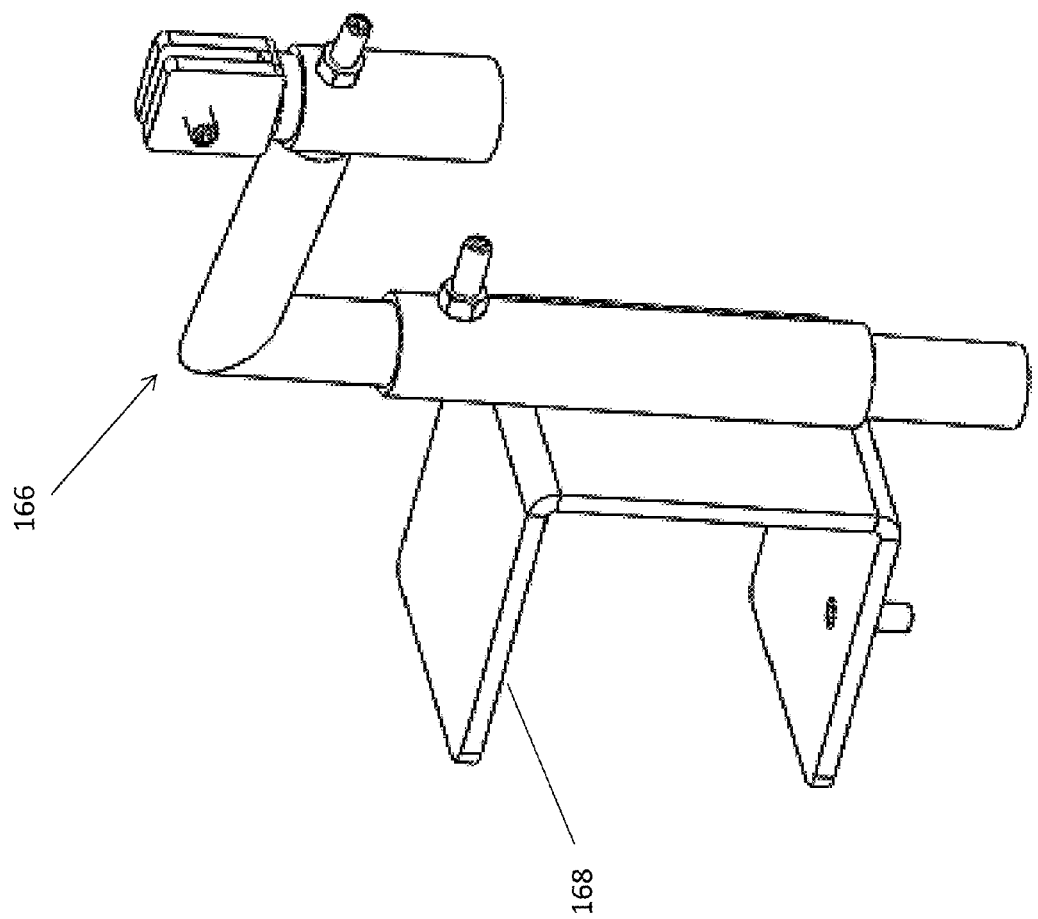
FIG. 11 is a perspective view of a frame mount formed in accordance with at least one embodiment.
Figure 12C:
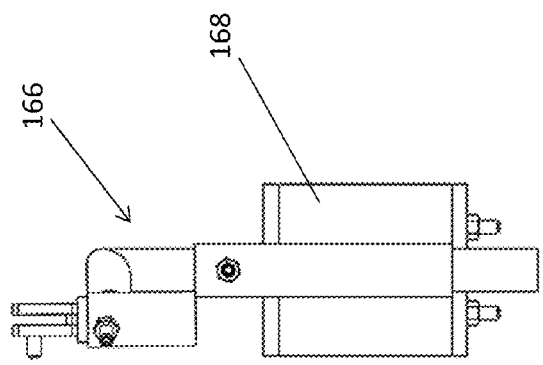
FIG. 12C is a front view of the frame mount shown in FIG. 12A.
Figure 12D:
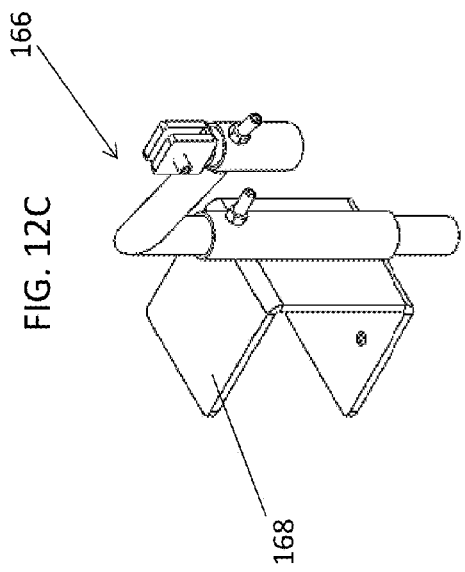
FIG. 12D is a top perspective view of the frame mount shown in FIG. 12A.
Figure 12A:
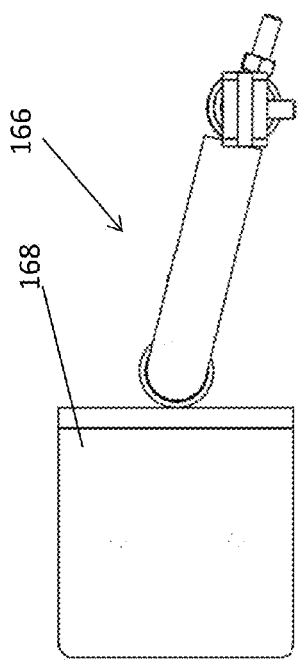
FIG. 12A is a top view of a frame mount formed in accordance with at least one embodiment.
Figure 12B:
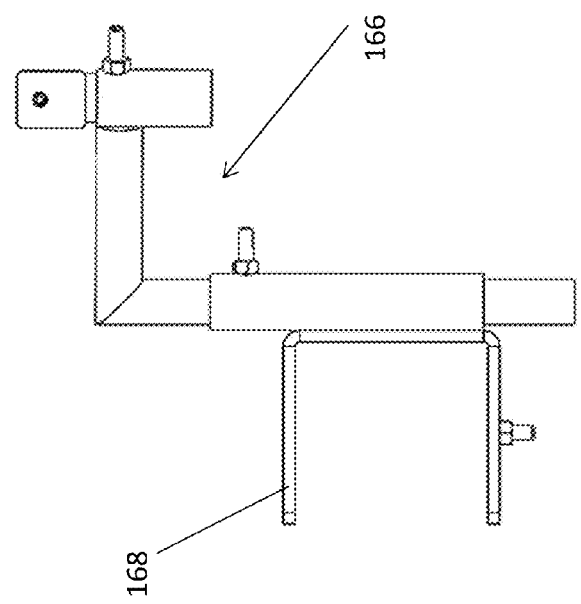
FIG. 12B is a side view of the frame mount shown in FIG. 12A.
Figure 15C:
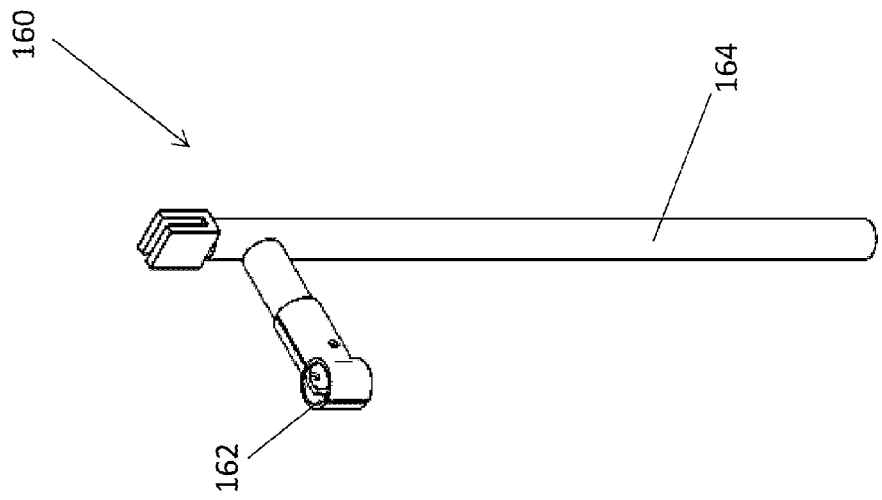
FIG. 15C is a side perspective view of the stand shown in FIG. 15A.
Figure 15B:
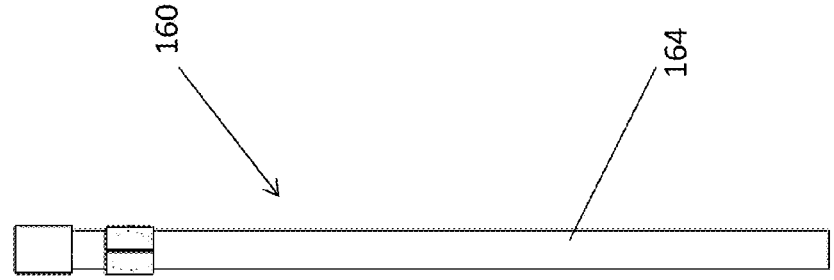
FIG. 15B is a front view of the stand shown in FIG. 15A.
Figure 15A:
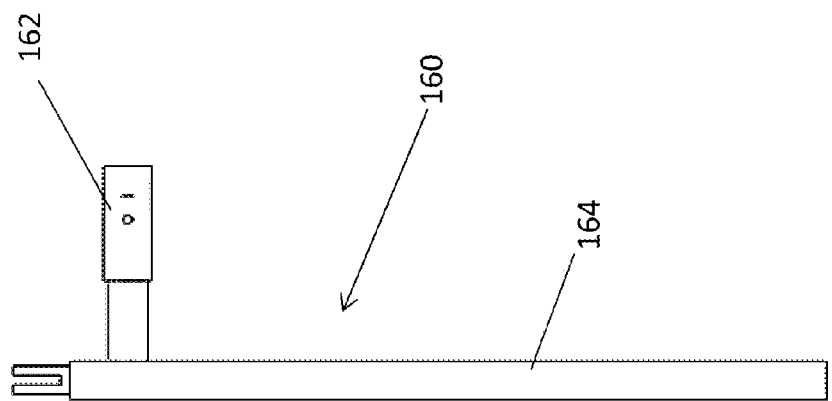
FIG. 15A is a top view of a stand formed in accordance with at least one embodiment.

FIG. 15 illustrates a mount 160 having a clamp 162 positioned on a first end and a stand 164 joined to a second end. FIGS. 11 and 12 illustrate a clamp 166 having a bracket 168 that is configured to join to a square or rectangular shaped support structure (not shown), for example an existing support structure.

FIGS. 3 and 4 illustrate a portion of a conveyor system 130 having a curved section 138. Curved sections may be included in any of the conveyor systems described herein to allow the planar rail 104 to be bent around existing structures. As illustrated in FIG. 5, the conveyor system 130 may also be assembled in a straight configuration.

Figure 16:
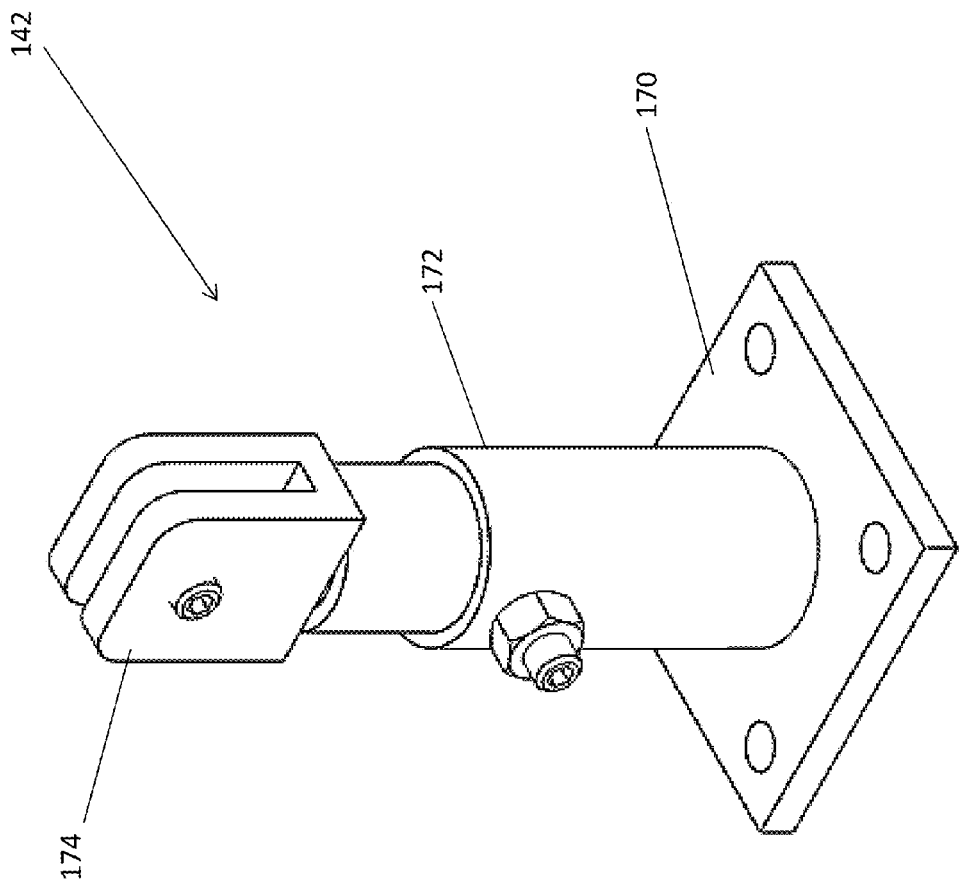
FIG. 16 is a perspective view of a stand formed in accordance with at least one embodiment.
Figure 17:
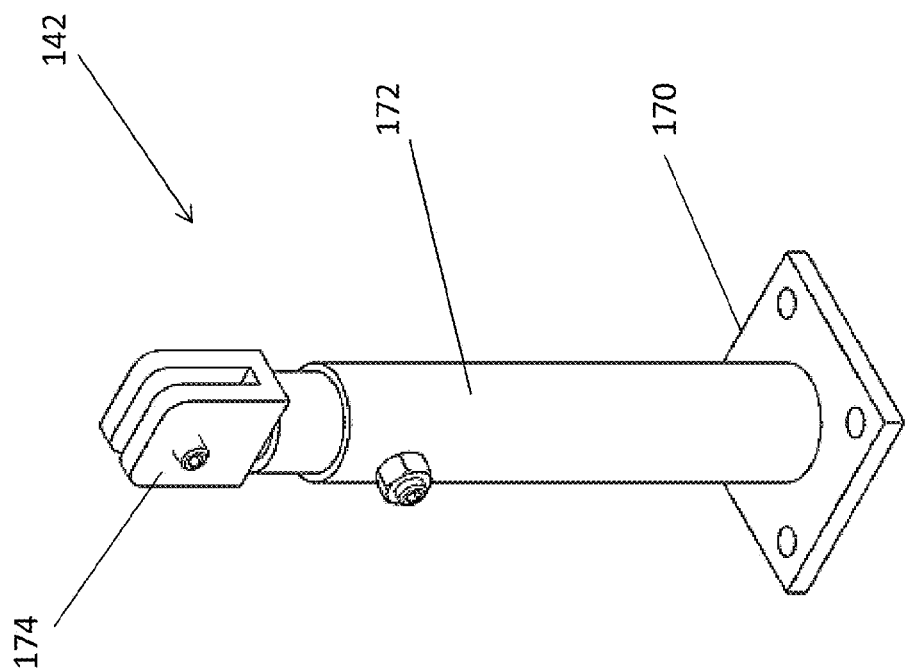
FIG. 17 is a perspective view of a stand formed in accordance with at least one embodiment.

FIG. 6 illustrates a portion of a table top conveyor system 140, wherein the planar rail 104 is secured to a top of a table (not shown) using table stands 142. The table stands 142 are illustrated in more detail in FIGS. 16 and 17, wherein FIG. 16 illustrates a short table stand 142 and FIG. 17 illustrates a tall table stand 142. The table stand 142 includes a base 170 that is bolted or otherwise secured to a table or countertop. A telescoping arm 172 extends from the base 170 and a clamp 174 is positioned at an end of the telescoping arm 172. The clamp 174 secures to the vertical rail 108.

It should be noted that any of the elements of FIGS. 1-18 may be combined to form a conveyor system. For example, a portion of the conveyor system may include any one of floor stands 102, table stands 142, or mounts 132. The conveyor system may also be configured to be straight and/or include curves therein.

Figure 19:
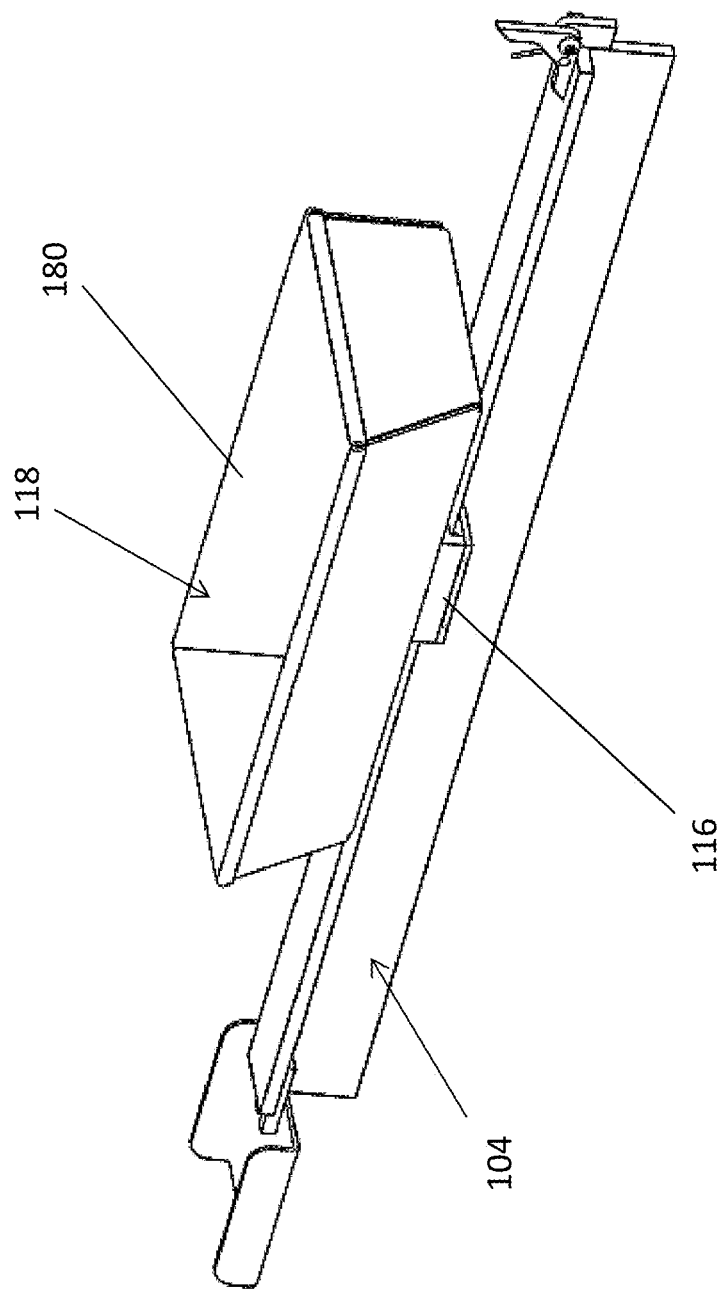
FIG. 19 is a perspective view of a coaster assembly and a tray formed in accordance with at least one embodiment.
Figure 24C:
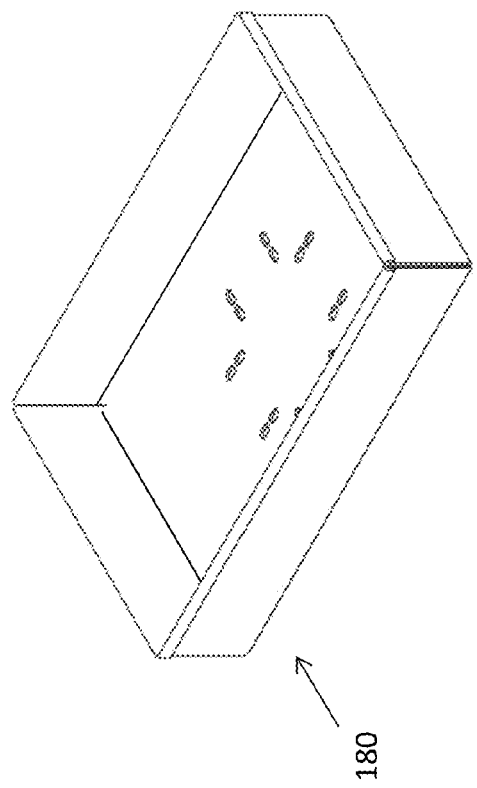
FIG. 24C is a side view of the tray shown in FIG. 24A.
Figure 24D:
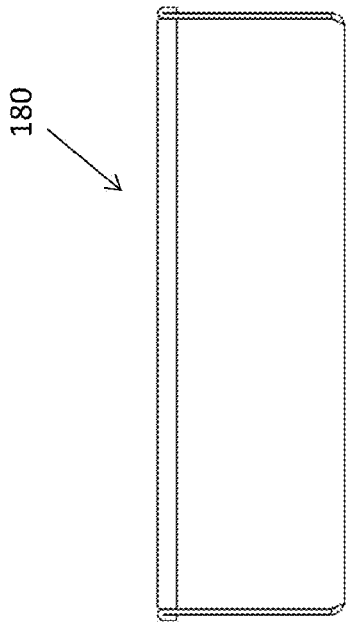
FIG. 24D is a top perspective view of the tray shown in FIG. 24A.
Figure 24A:
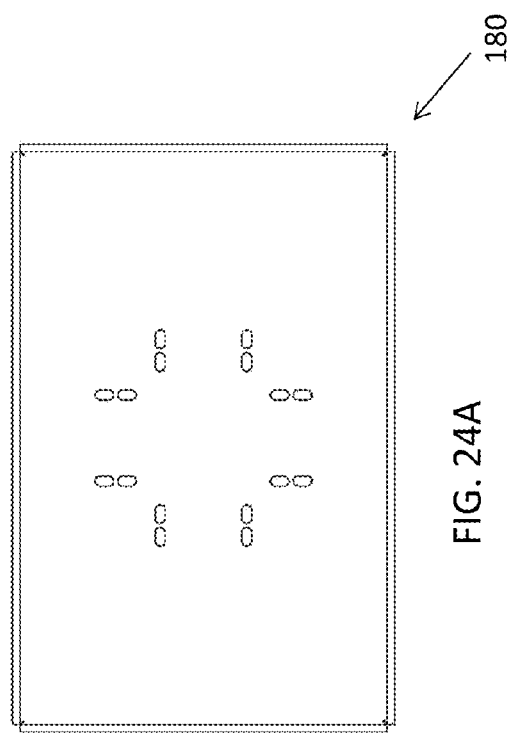
FIG. 24A is a top view of a tray formed in accordance with at least one embodiment.
Figure 24B:
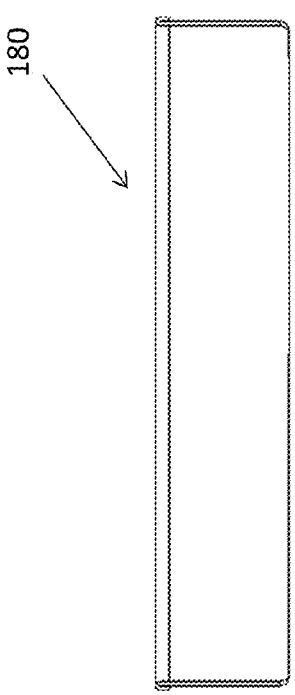
FIG. 24B is a front view of the tray shown in FIG. 24A.
Figure 25:
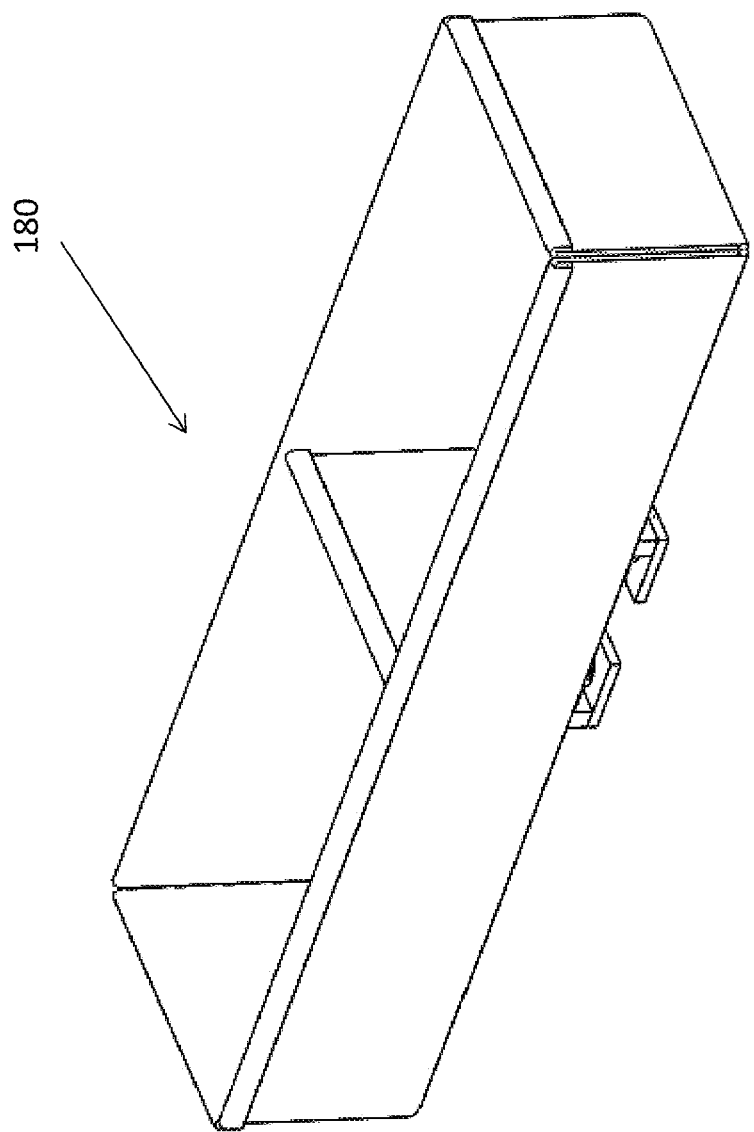
FIG. 25 is a perspective view of a tray formed in accordance with at least one embodiment.
Figure 27:
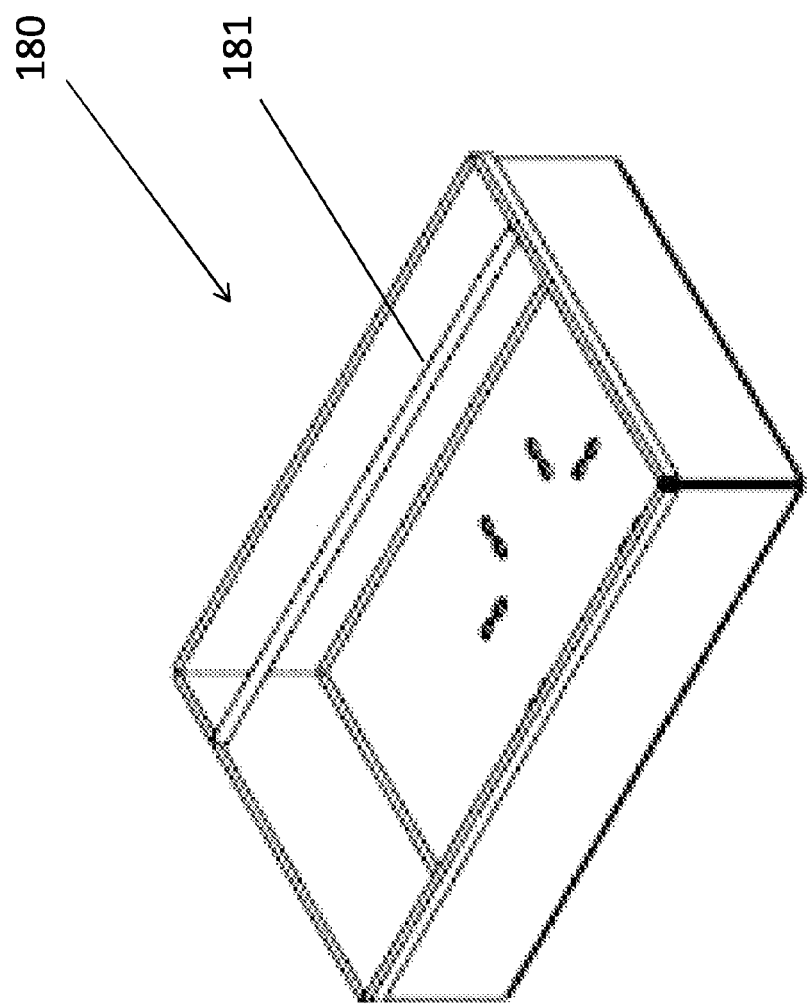
FIG. 27 is a perspective view a tray formed in accordance with at least one embodiment.
Figure 28:
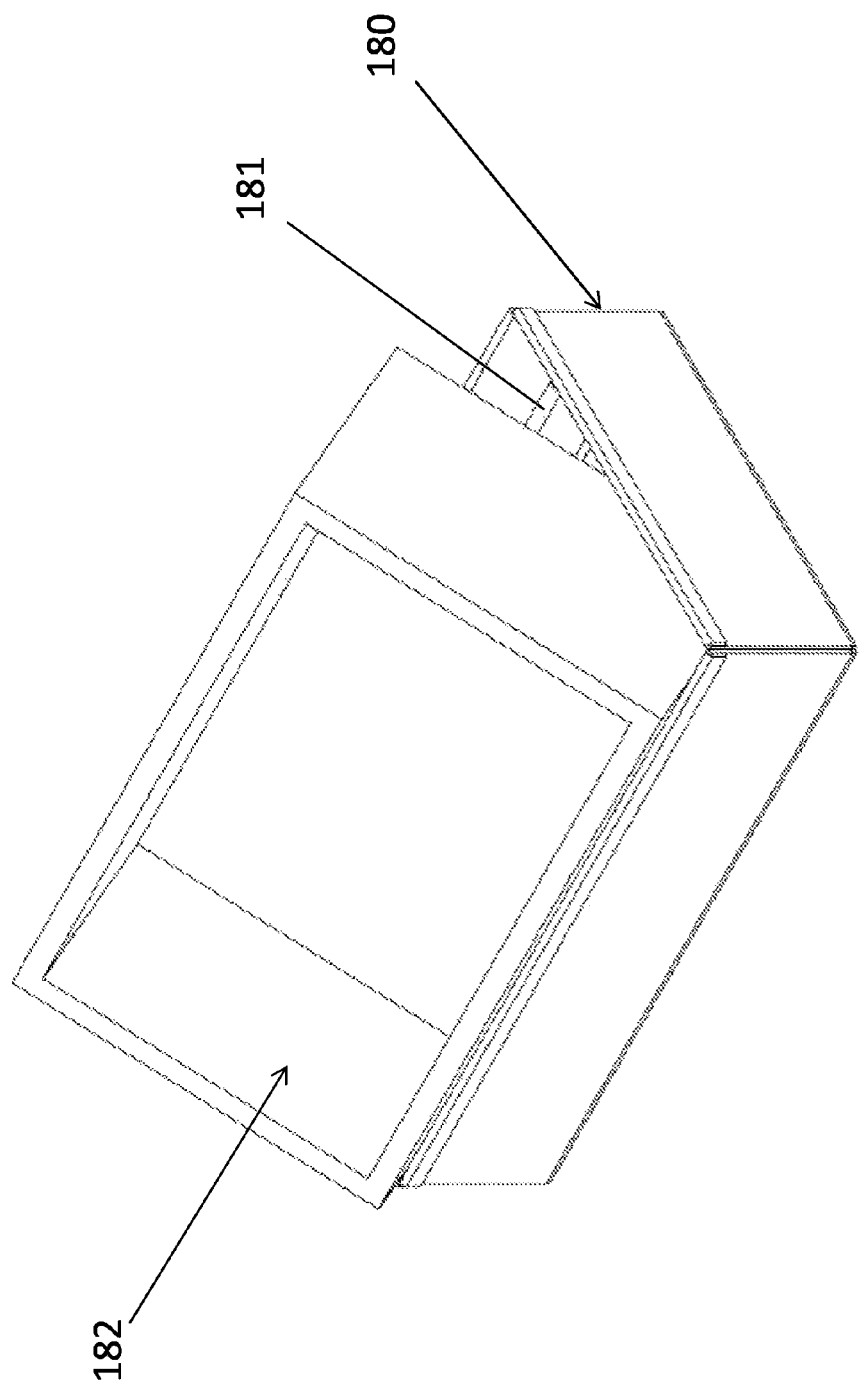
FIG. 28 is a perspective view of the tray illustrated in FIG. 27 and having a parts box positioned therein.

FIG. 19 illustrates a coaster assembly 116 positioned on the planar rail 104. A parts delivery device 118 is coupled to the coaster assembly 116. In the exemplary embodiment, the parts delivery device 118 is a tray 180. FIGS. 22-28 illustrate various embodiments of a tray 180 having various different sizes and configurations to retain a parts container 182 as shown in FIG. 28. FIGS. 27 and 28 illustrate a tray 180 having a bar 181 positioned therein to angle the parts container 182 as shown in FIG. 28.

A portion of the coaster assembly 116 is illustrated in detail in FIG. 20. The coaster assembly 116 includes an upper bearing assembly 184 having upper bearings 124 that engage the top 128 of the horizontal rail 106 when the coaster assembly 116 is positioned on the planar rail 104. The upper bearings 124 are low friction bearings that allow the coaster assembly 116 to glide along the horizontal rail 106 with little force applied. A top 186 of the upper bearing assembly 184 includes apertures formed therein to receive a blot or screw (not shown). In particular, the tray 180 is secured to the upper bearing assembly 184 with the bolt or screw. In an exemplary embodiment, two coaster assemblies 116 are secured to the tray 180 so that a coaster assembly 116 is positioned on each side of the horizontal rail 106.

A side bearing assembly 190 (shown in detail in FIG. 21) is secured to a bottom 188 of the upper bearing assembly 184. The side bearing assembly 190 includes side bearings 126 that are aligned with the upper bearings 124. The side bearings 126 engage the side 130 of the horizontal rail 106 when the coaster assembly 116 is positioned on the planar rail 104. In particular, with two coaster assemblies 116 attached to the tray 180, the side bearings 126 of a first coaster assembly 116 engage a first side 130 of the horizontal rail 106 and the side bearings 126 of a second coaster assembly 116 engage a second side 130 of the horizontal rail 106. The side bearings 126 are low friction bearings that allow the coaster assembly 116 to glide along the horizontal rail 106 with little force applied.

Figure 29:
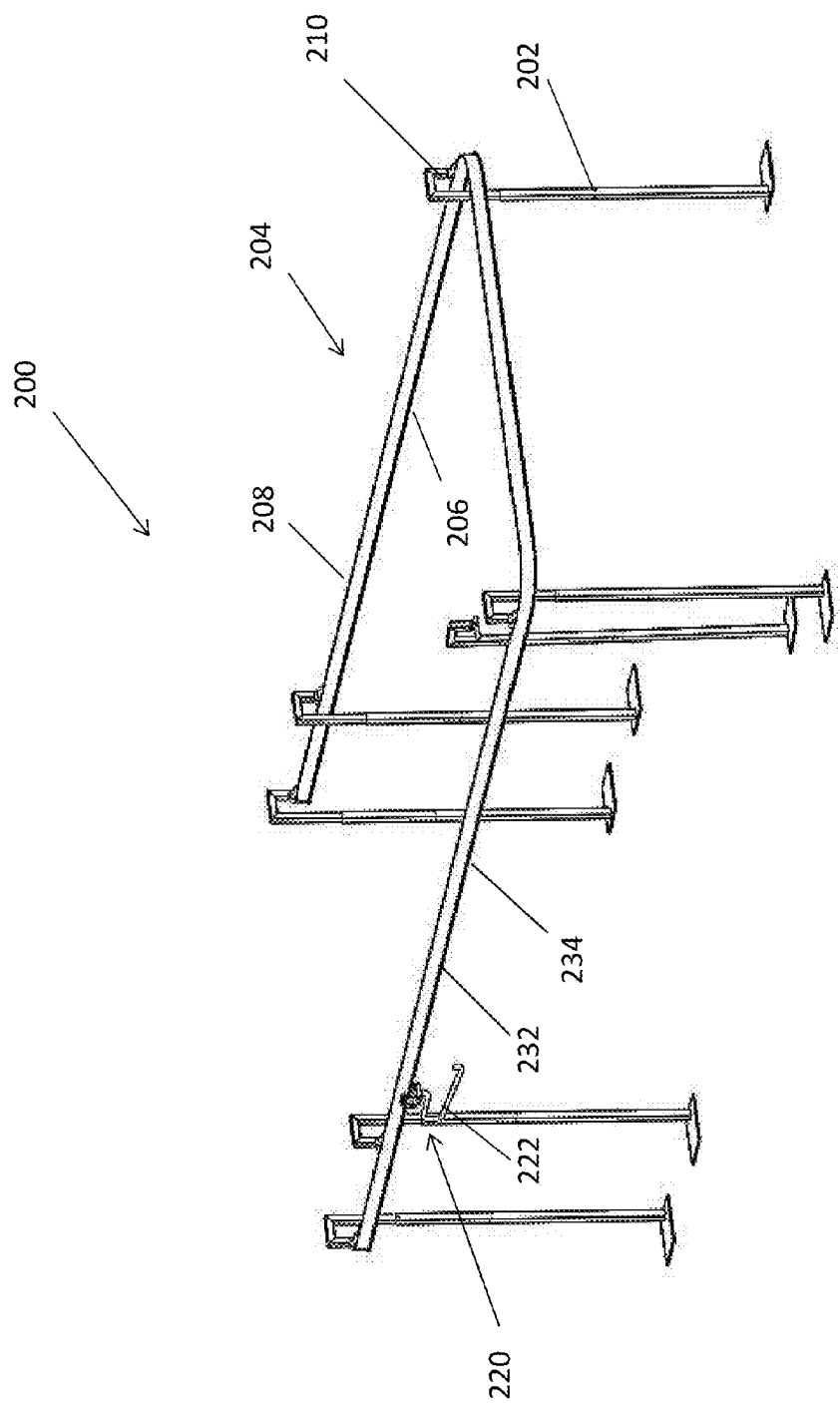
FIG. 29 is a perspective view of a portion of an overhead hanging conveyor system formed in accordance with at least one embodiment.
Figure 30:
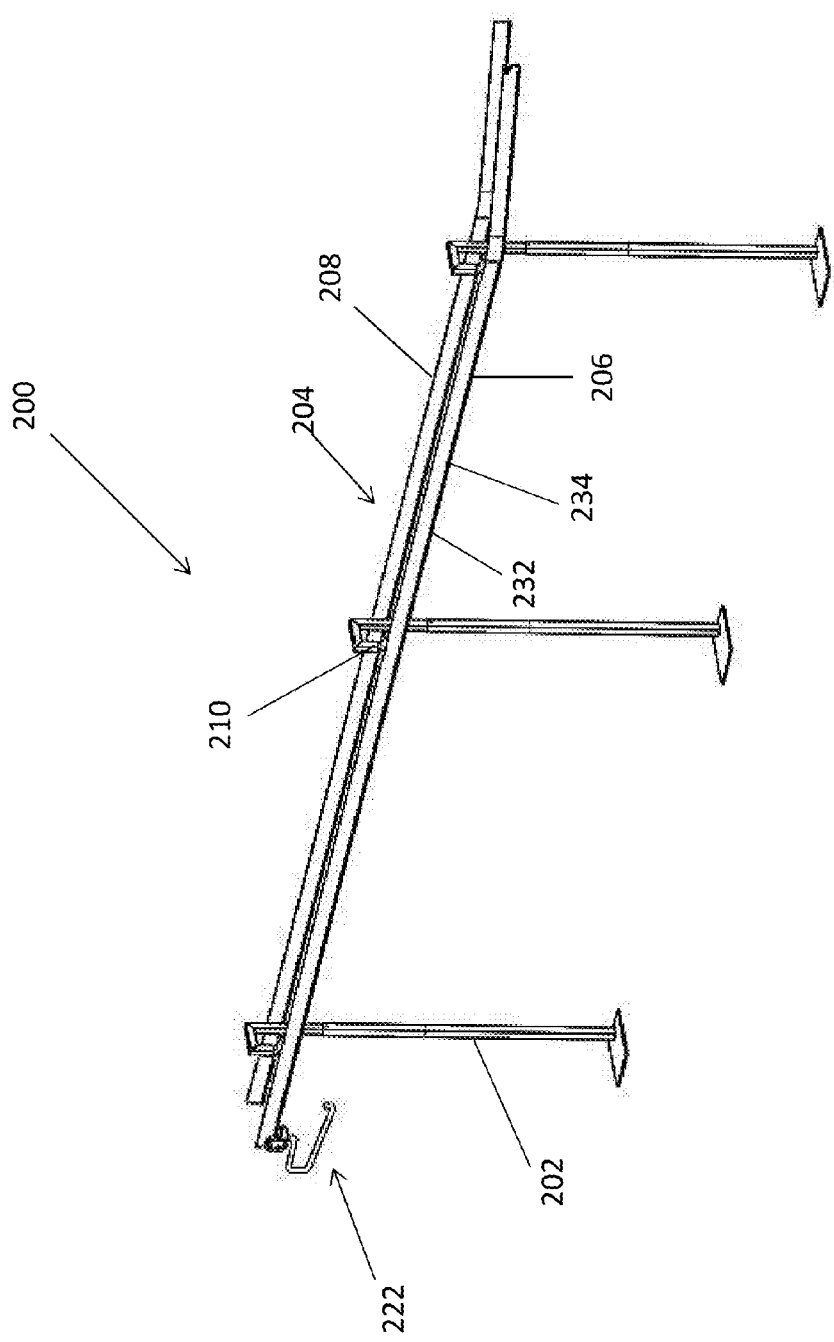
FIG. 30 is a perspective view of the portion of the conveyor system shown in FIG. 29.
Figure 31:
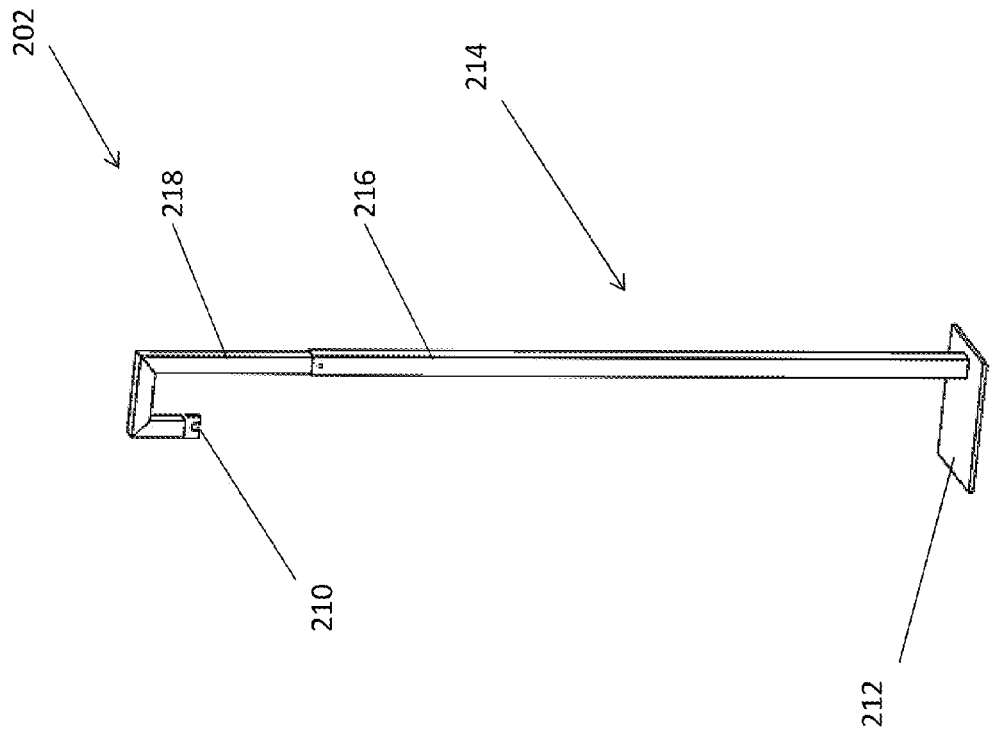
FIG. 31 is a perspective view of a stand formed in accordance with at least one embodiment.

FIGS. 29 and 30 illustrate a portion of another embodiment of a conveyor system 200 that hangs from floor stands 202 (shown in FIG. 31). The conveyor system 200 includes a planar rail 204 including a horizontal rail 206 and a vertical rail 208. The horizontal rail 206 and the vertical rail 208 include planar surfaces. The horizontal rail 206 is positioned substantially perpendicular to the vertical rail 208 in a T-shape and the vertical rail 208 extends upward from the horizontal rail 206. Clamps 210 of the floor stands 202 are attached to the vertical rail 208 to support the planar rail 204. The clamps 210 may be welded, bolted, or otherwise attached to the vertical rail 208. Referring to FIG. 31, the floor stands 202 are balanced with a base 212 that may be free standing or bolted to the ground. A telescoping post 214 extends from the base 212. The telescoping post 214 includes a first telescoping section 216 joined to the base 212 and a second telescoping section 218 that is positioned within the first telescoping section 216 and extends and retracts therefrom to adjust a height of the floor stand 202. The second telescoping section 216 includes a U-shaped end 220 that enables the planar rail 104 to be hung from the second telescoping section 216. The clamp 210 is attached to an end of the second telescoping section 216.

Sections of the planar rail 204 may be joined together with a joint (not shown) to form an elongated conveyor system 200. Neither the joints nor the clamps 210 are joined to the horizontal rail 206, thereby leaving the horizontal rail 206 unencumbered so that the horizontal rail 206 may receive a coaster assembly 220 having a parts delivery device 222 attached thereto (shown in more detail in FIGS. 33 and 34). The coaster assembly 220 glides along the horizontal rail 206 from a starting block (not shown) to a stopper 226 (shown in FIG. 32). In particular, the coaster assembly 220 includes upper bearings 228 (shown in FIG. 35) and side bearings 230 (shown in FIG. 35) that engage a top 232 of the horizontal rail 206 and a side 234 of the horizontal rail 206, respectively, to guide the coaster assembly 220 along the horizontal rail 206. In at least one embodiment, the planar rail 204 is angled at a decline from the starting block towards the stopper 226 to aid the movement of the coaster assembly 220 with gravity.

Figure 32:
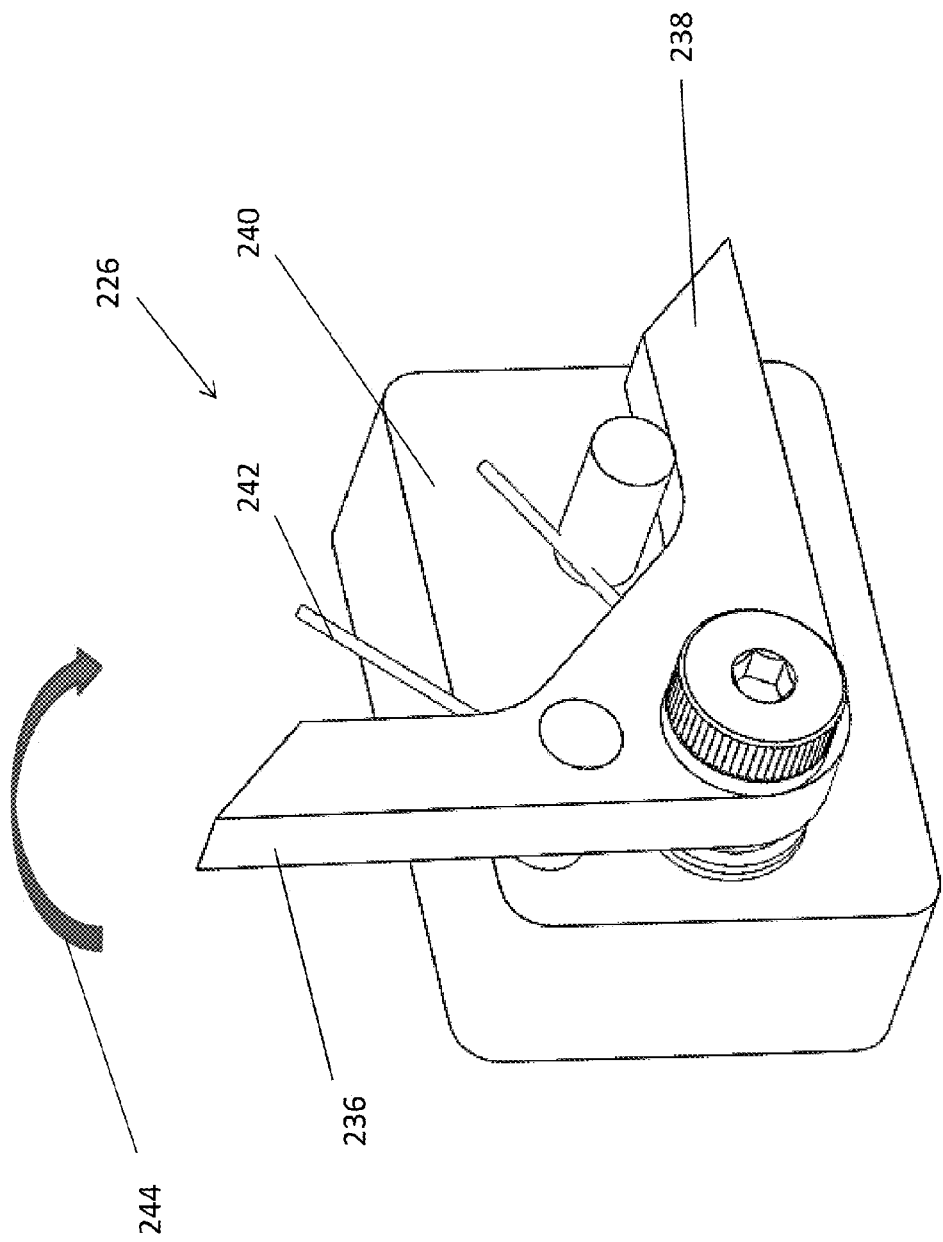
FIG. 32 is a perspective view of a stopper formed in accordance with at least one embodiment.

Referring to FIG. 32, the stopper 226 includes a stopping end 236 attached to an actuating end 238. A hinge 240 allows the stopper 226 to be rotated and a spring 242 returns the stopper 226 to a stopping position. In the stopping position, the coaster assembly 220 engages the stopping end 236 at the end of the planar rail 204. The actuating end 238 is then manipulated to rotate the stopping end 236 in the direction of arrow 244 to enable the coaster assembly 220 to be removed from the planar rail 204.

An assembly facility may include multiple conveyor systems 200. In particular, the assembly facility may include a delivery conveyor system 200 that delivers parts from a delivery path of the assembly facility to the assembly line and/or machining station, and a return conveyor system 200 that returns the parts delivery device 222 from the assembly line and/or machining station to the delivery path. Other embodiments may include more than one delivery conveyor system 200 and/or more than one return conveyor system 200.

Figure 33:
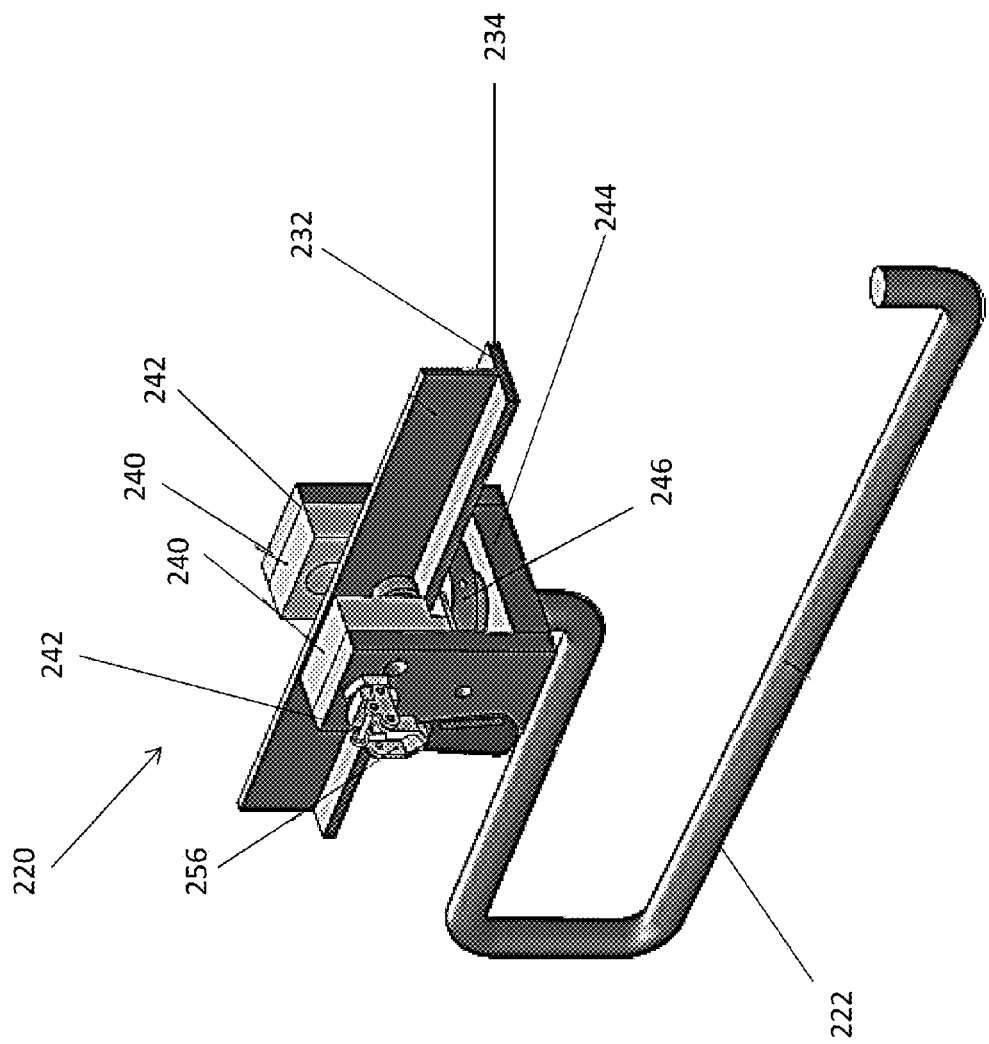
FIG. 33 is a perspective view of a coaster assembly formed in accordance with at least one embodiment and positioned on the rail shown in FIG. 31.
Figure 34:
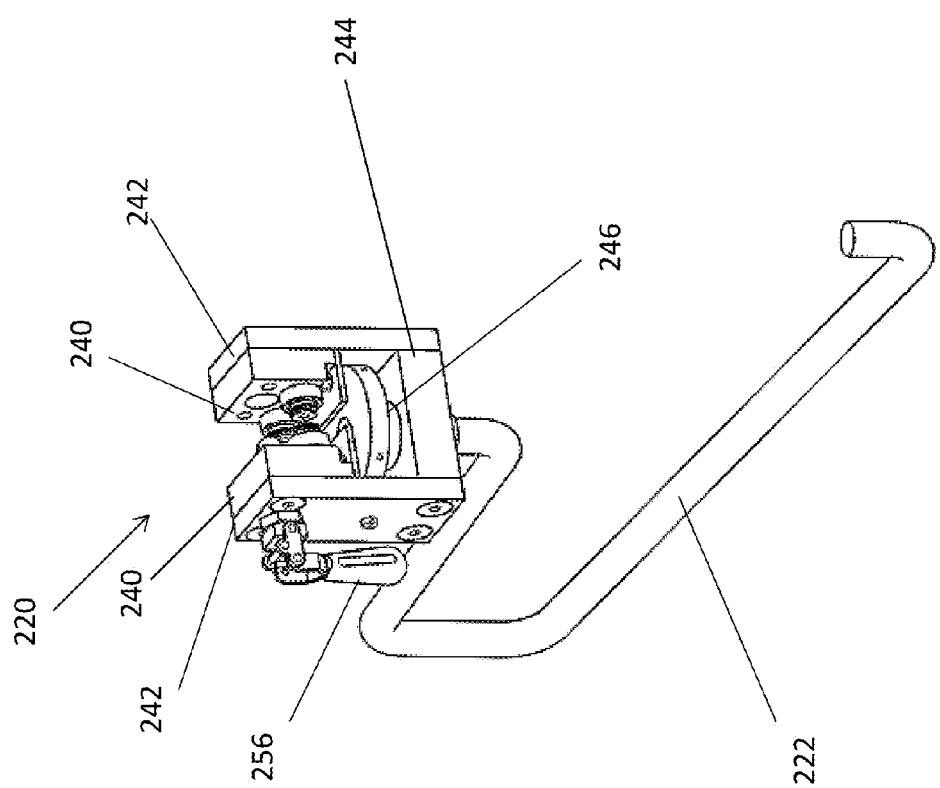
FIG. 34 is a perspective view of the coaster assembly.

FIGS. 33 and 34 illustrate the coaster assembly 220. In particular FIG. 33 illustrates the coaster assembly 220 attached to the planar rail 204 and FIG. 34 illustrate the coaster assembly 220 detached from the planar rail 204. The coaster assembly 220 includes two bearing assemblies 240 (shown in more detail in FIGS. 35 and 36) each coupled to a side block 242 (shown in more detail in FIG. 37). A bottom block 244 (shown in more detail in FIG. 38) joins the two side blocks 242 and includes a swivel assembly 246 (shown in more detail in FIG. 39). The parts delivery device 222 is attached to the swivel assembly 246. In the exemplary embodiment, the parts delivery device 222 is a hook.

Figure 35:
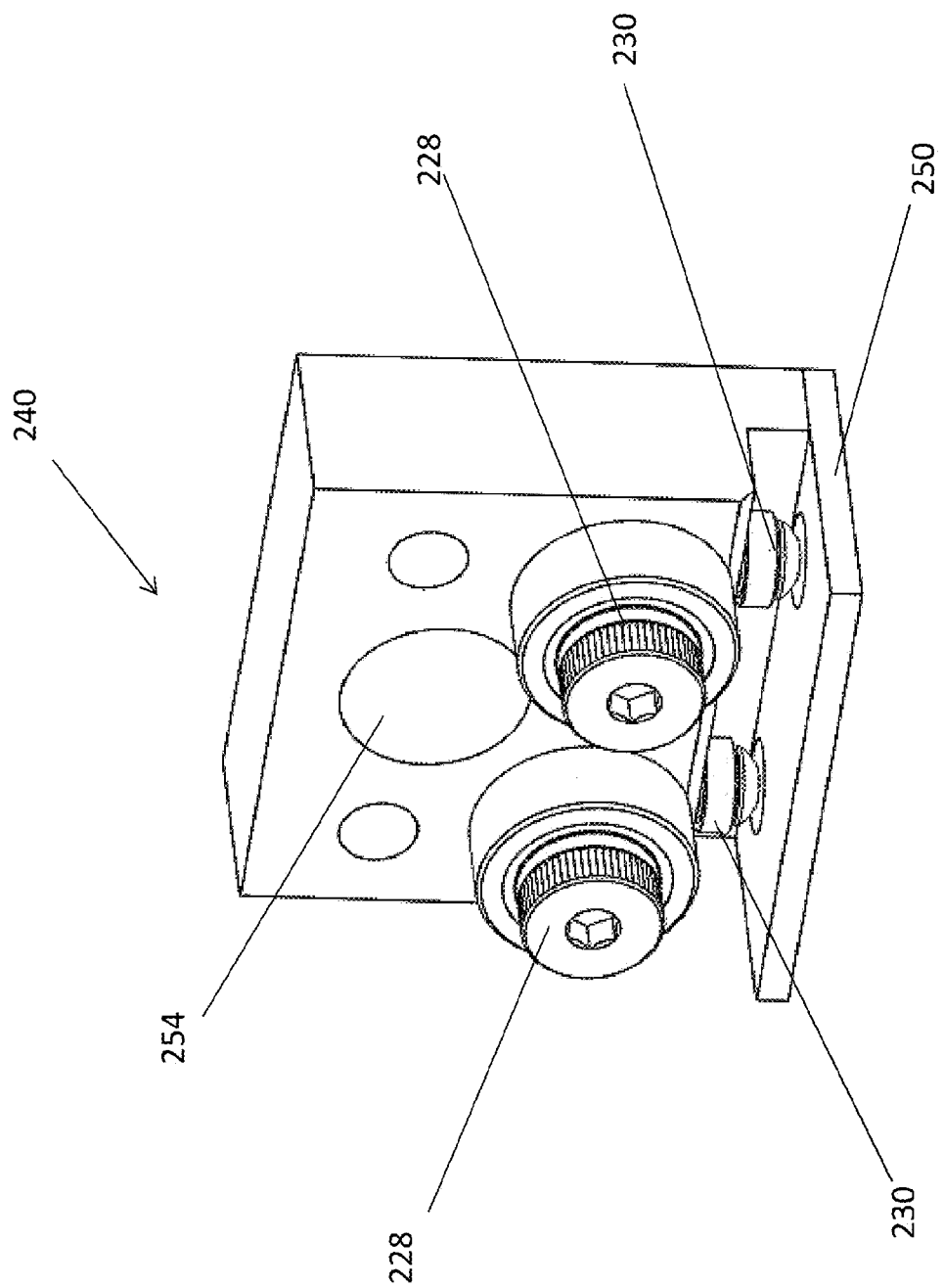
FIG. 35 is a perspective view of a portion of the coaster bearing assembly formed in accordance with at least one embodiment.
Figure 38C:
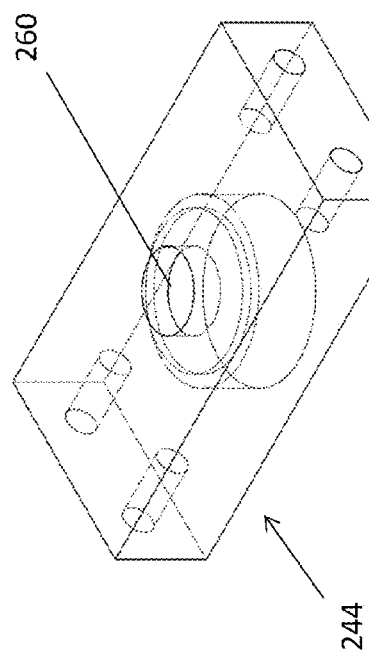
FIG. 38C is a side view of the coaster bearing assembly shown in FIG. 38A.
Figure 38D:
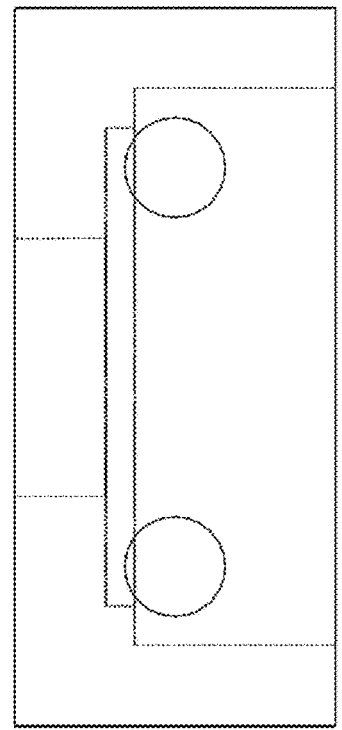
FIG. 38D is a top perspective view of the coaster bearing assembly shown in FIG. 38A.
Figure 38A:
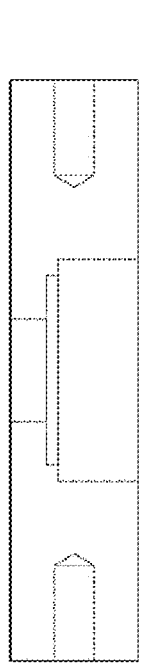
FIG. 38A is a front view of a portion of a coaster bearing assembly formed in accordance with at least one embodiment.
Figure 38B:
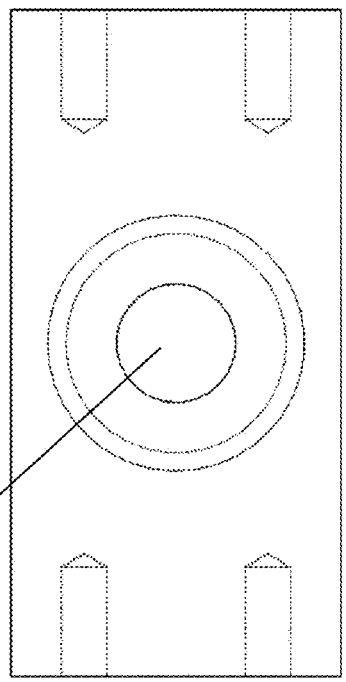
FIG. 38B is a top view of a coaster bearing assembly shown in FIG. 38A.

Referring to FIGS. 35 and 36, a portion of the bearing assembly 240 includes the upper bearings 228 and side bearings 230 that engage a top 232 of the horizontal rail 206 and a side 234 of the horizontal rail 206, respectively. The side bearings 230 are aligned with the upper bearings 228. The upper bearings 228 and the side bearings 230 are low friction bearings that enable the coaster assembly 220 to glide along the horizontal rail 206 with little force. A plate 250 is joined to the bottom of the bearing assembly 240 to prevent the coaster assembly 220 from becoming dislodged from the planar rail 204. Particularly, the upper bearings 228 are positioned along the top 232 of the horizontal rail 206 and the plate 250 is positioned along a bottom 252 (shown in FIG. 33) of the horizontal rail 206. Additionally, the side bearings 230 engage the side 234 of the horizontal rail 206, so that the horizontal rail 206 is enclosed on all sides.

Referring to FIG. 37, the side block 242 includes an opening 252 therethrough that aligns with an opening 254 (shown in FIG. 35) formed in the bearing assembly 240. A toggle 256 (shown in FIGS. 33 and 34) extends through the openings 252 and 254 to provide a brake for the coaster assembly 220. In particular, the toggle 256 may be actuated to extend through the openings 252 and 254 and engage the vertical rail 208. When the toggle 256 is engaged with the vertical rail 208, the coaster assembly 220 is prevented from moving along the planar rail 204.

Referring to FIG. 38, the bottom block 244 includes an opening 260 therethrough to receive an end of the parts delivery device 222. The swivel assembly 246 (shown in FIG. 39) is coupled to the end of the parts delivery device 222. The parts delivery device 222 rotates about the swivel assembly 246 to alter a position of the parts delivery device 222. In at least one embodiment, the bottom block 244 may include a stopper (not shown) that engages indentations (not shown) in the swivel assembly 246 to limit rotation of the parts delivery device 222. In particular, the swivel assembly 246 may be configured to lock the parts delivery device 222 at 0°, 90°, 180°, or 270°. In other embodiments, the swivel assembly 246 may lock at any angle.

To determine the material makeup of the rail, an online beam calculator or an internal beam calculator in Solidworks® is utilized. Based on tray size and weight per tray, the load per the span is determined and multiplied by 1.5 using only the vertical rib of the rail for the calculation. The material selection is based on maximum deflection. The target number is <0.010" total deflection over the span. The span distance is modified until the desired deflection is obtained. If the span is less than 48", material height and thickness are increased until the desired deflection result is obtained. The welded horizontal "track" portion of the assembly adds additional strength and rigidity.

Figure 40:
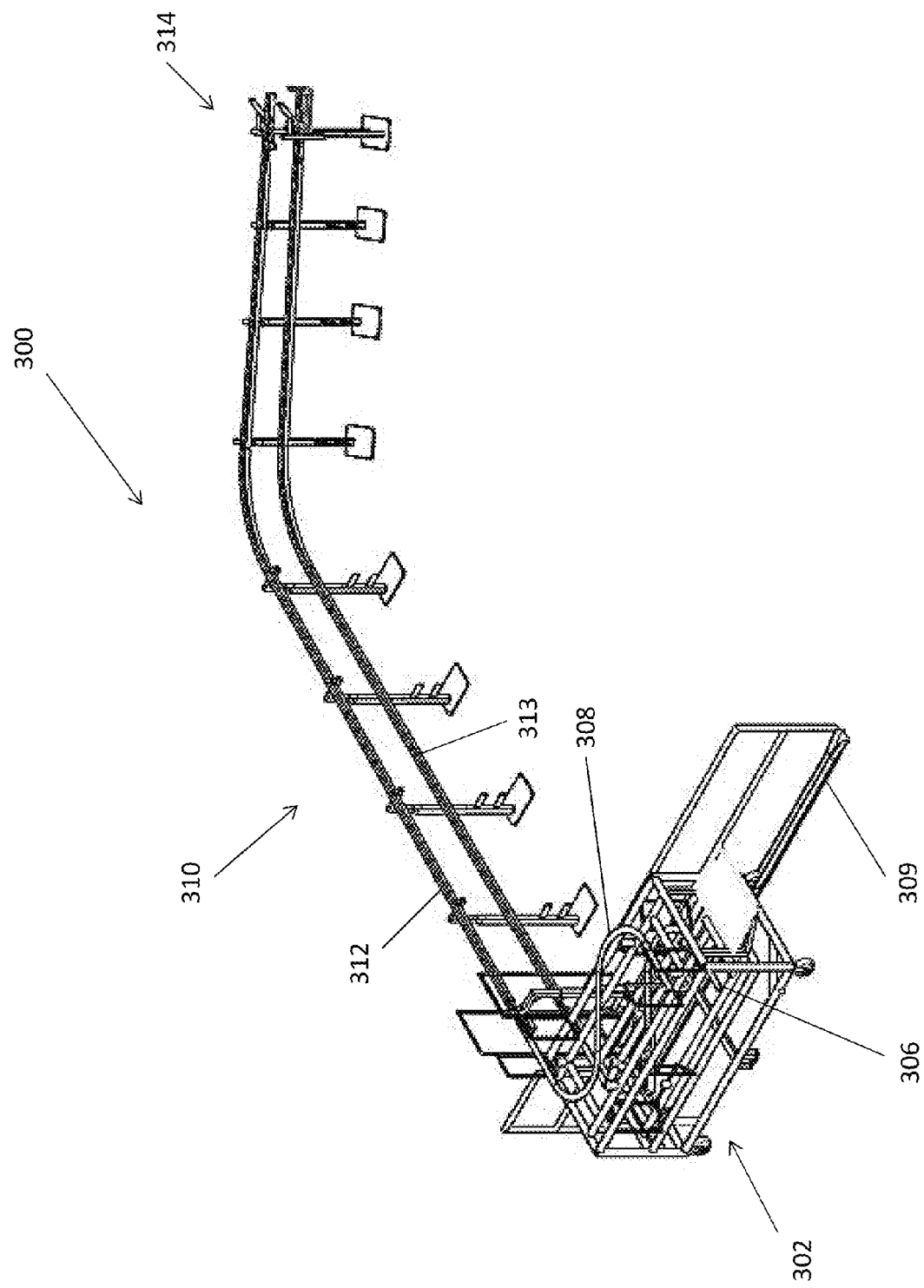
FIG. 40 is a top perspective view of an assembly station formed in accordance with at least one embodiment.
Figure 41:
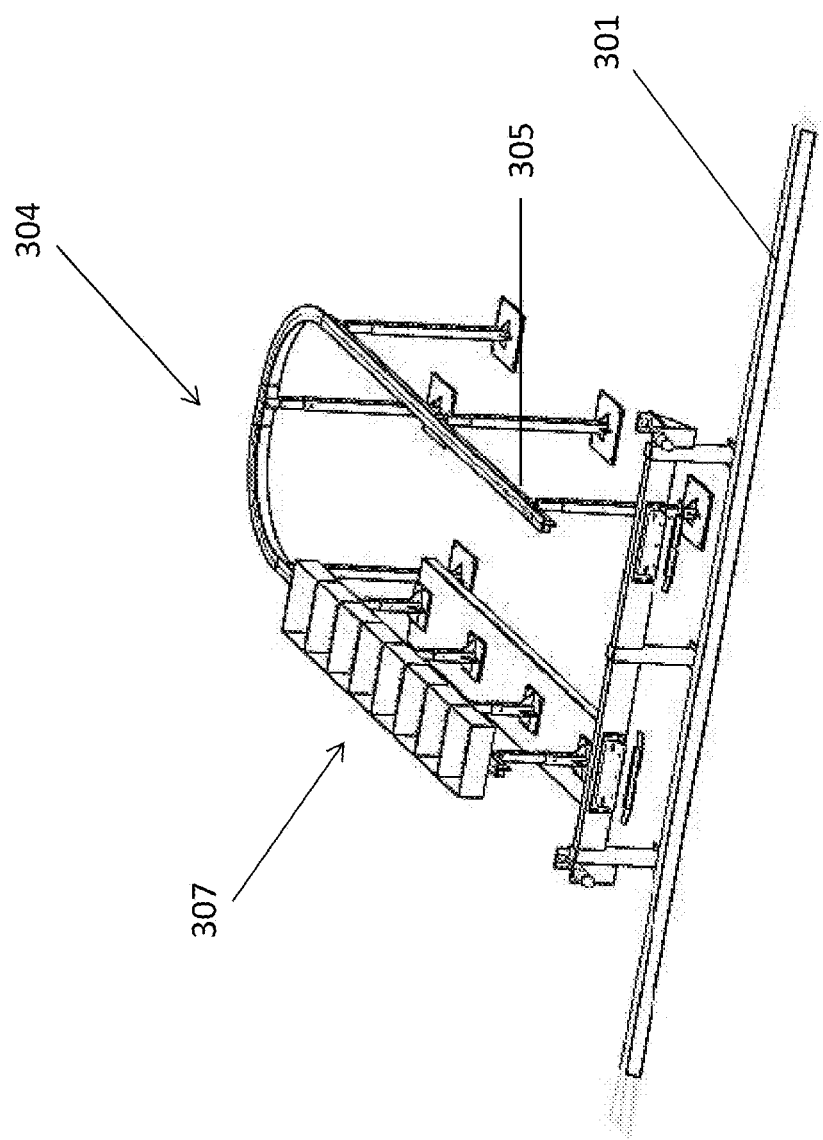
FIG. 41 is a top perspective view of a loading station formed in accordance with at least one embodiment.

In at least one embodiment, as shown in FIGS. 40 and 41, a conveyor system 300 includes a loading cart 302. The loading cart 302 may be preloaded with coaster assemblies at a loading station 304, as illustrated in FIG. 41. The cart 302 locks into a guide 301 of the loading station 304 to align the cart 302 within the loading station 304. The loading station 304 receives empty coaster assemblies from a bottom rail 306 of the cart 302. After being loaded with parts, the coaster assemblies are moved via a rail 305 to a hydraulic section 307 of the loading station 304, where they may be raised to a position that is level with a top rail 308 of the cart 302. The coaster assemblies move from the loading station 304 to the top rail 308 of the cart 302. After the coaster assemblies are loaded on the top rail 308 of the cart 302, the cart 302 may be moved to an assembly station 310, as shown in FIG. 40 and locked into a guide 309 of the assembly station 310. At the assembly station 310, the coaster assemblies may be moved from the top rail 308 of the cart 302 to a delivery rail 312 of the assembly station 310. The coaster assemblies move along the rail 312 to an assembly point 314, where the parts may be removed from the coaster assemblies. After the parts are removed from the coaster assemblies, the coaster assemblies may be moved along a return rail 313 back to the cart 302, where the empty coaster assemblies may be loaded onto the bottom rail 306 of the cart 302.

Figure 42:
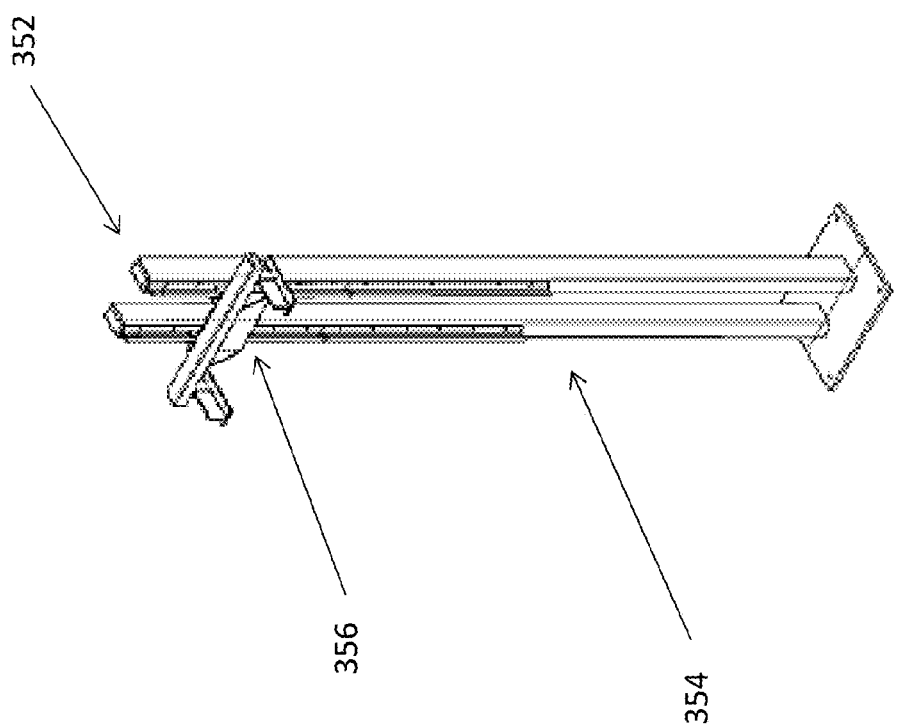
FIG. 42 is a front perspective view of a hydraulic lift formed in accordance with at least one embodiment.
Figure 43:
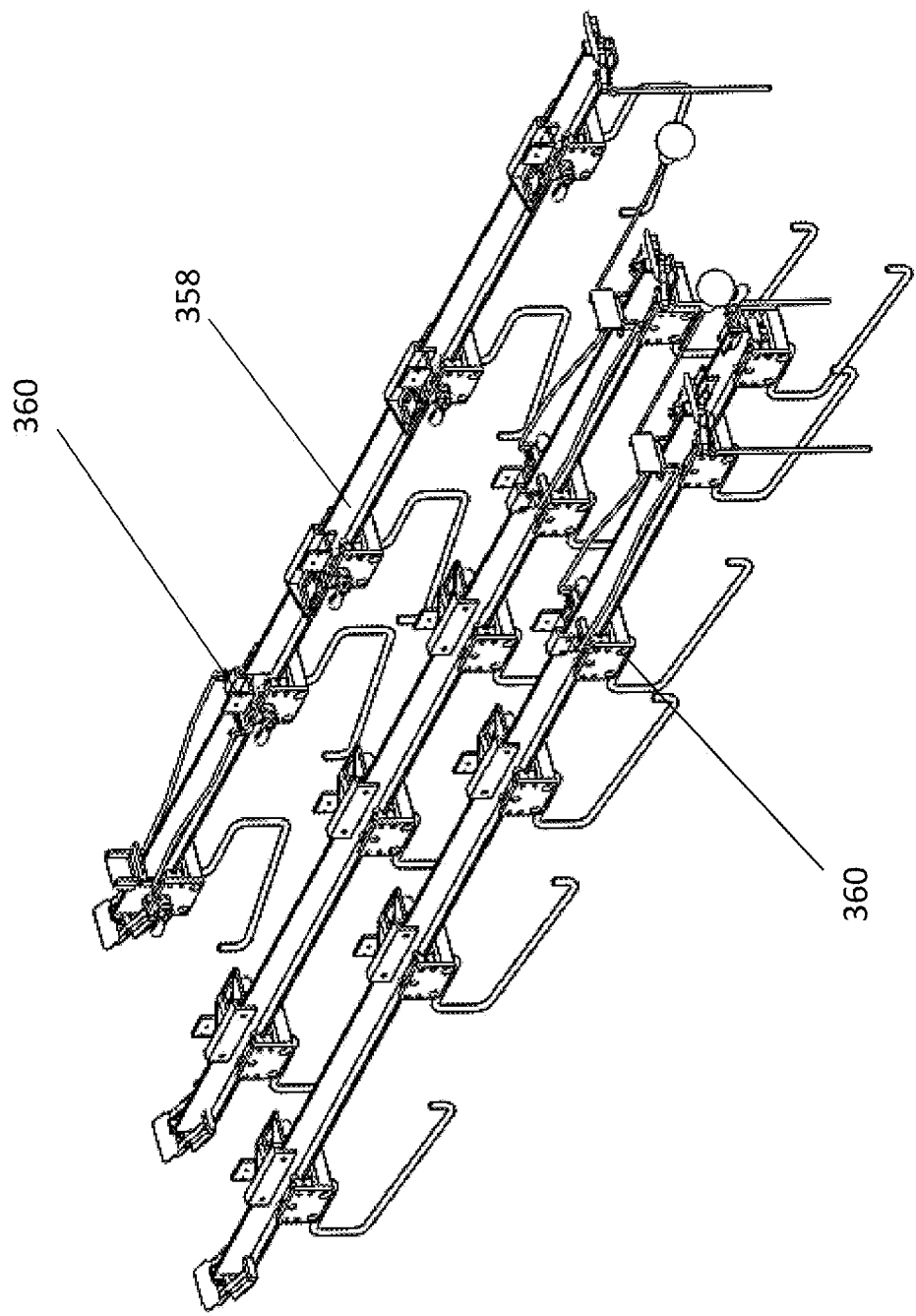
FIG. 43 is a top perspective view of a conveyor system formed in accordance with at least one embodiment.

FIG. 42 illustrates another embodiment of part of a conveyor system that includes a hydraulic lift 352 that raises the coaster assemblies from a loading position 354 to a transfer position 356, where the coaster assemblies are released onto a rail 358, as shown in FIG. 43. In at least one embodiment, the rail 358 includes hydraulic stoppers 360 to stop the coaster assemblies at predetermined positions along the rail 358. In another embodiment, the rail 358 may include dampening mechanisms 362, as shown in FIG. 44, that slow the coaster assemblies as they travel along the rail 358. The dampening mechanism 362 may include a spring 364 that compresses to allow the coaster assembly to pass over the dampening mechanism 362 so that the dampening mechanism 362 slows the coaster assembly.

In at least one embodiment, as shown in FIG. 45, a rail 400 is formed as a spiral that is configured to retain multiple coaster assemblies. The spiral 400 may be able to retain enough coaster assemblies to retain all of the parts for a 24 hour period. As each coaster assembly is emptied, the remaining coaster assemblies move down the spiral 400 so that the parts therein can be emptied.

FIG. 46 illustrates a coaster assembly 500 having posts 502 to retain parts. When the parts are entirely removed from a post 502, the assembly 500 rotates to position another post 502 within reach of an assembly line worker.

While this disclosure has been described as having a preferred design, the systems and methods according to the present disclosure can be further modified within the scope and spirit of this disclosure. This application is therefore intended to cover any variations, uses, or adaptations of the disclosure using its general principles. For example, the methods disclosed herein and in the appended claims represent one possible sequence of performing the steps thereof. A practitioner may determine in a particular implementation that a plurality of steps of one or more of the disclosed methods may be combinable, or that a different sequence of steps may be employed to accomplish the same results. Each such implementation falls within the scope of the present disclosure as disclosed herein and in the appended claims. Furthermore, this application is intended to cover such departures from the present disclosure as come within known or customary practice in the art to which this disclosure pertains and which fall within the limits of the appended claims.

What is claimed is:

1. A conveyor system comprising:
   a rail having a starting block at a first end and a stopper at a second end;
   a coaster assembly configured to travel along the rail, the coaster assembly comprising:
      an upper bearing that engages a top of the rail, wherein the upper bearing is oriented in a first direction, and
      a side bearing that engages a side of the rail, wherein the side bearing is oriented in a second direction, the second direction being different from the first direction; and
   a parts delivery device attached to the coaster assembly.

2. The conveyor system of claim 1, wherein the parts delivery device is at least one of a tray or a hook.

3. The conveyor system of claim 1, wherein the starting block aligns the upper bearing with the top of the rail and the side bearing with the side of the rail.

4. The conveyor system of claim 1, wherein the stopper is moveable to allow the coaster assembly to be removed from the rail.

5. The conveyor system of claim 1, wherein the rail declines from the starting block to the stopper.

6. The conveyor system of claim 1, wherein the rail includes at least one curve.

7. The conveyor system of claim 1, wherein the coaster assembly includes a toggle clamp to engage the rail when closed to prevent movement of the coaster assembly along the rail.

8. The conveyor system of claim 1, wherein the coaster assembly includes a swivel to alter a position of the parts delivery device on the coaster assembly.

9. The conveyor system of claim 1, wherein the rail retains multiple coaster assemblies.

10. The conveyor system of claim 1 further comprising a hydraulic lift to raise the coaster assembly to the starting block of the rail.

11. The conveyor system of claim 1 further comprising hydraulic stoppers positioned along a length of the rail.

12. A conveyor system comprising:
    a rail having a starting block at a first end and a stopper at a second end, the rail declining from the starting block to the stopper;
    a coaster assembly configured to travel along the rail, the coaster assembly comprising:
       an upper bearing that engages a top of the rail, and
       a side bearing that engages a side of the rail;
    a parts delivery device attached to the coaster assembly; and
    a hydraulic lift to raise the coaster assembly to the starting block of the rail.

13. The conveyor system of claim 12, wherein the parts delivery device is at least one of a tray or a hook.

14. The conveyor system of claim 12, wherein the starting block aligns the upper bearing with the top of the rail and the side bearing with the side of the rail.

15. The conveyor system of claim 12, wherein the stopper is moveable to allow the coaster assembly to be removed from the rail.

16. The conveyor system of claim 12, wherein the rail includes at least one curve.

17. The conveyor system of claim 12, wherein the coaster assembly includes a toggle clamp to engage the rail when closed to prevent movement of the coaster assembly along the rail.

18. The conveyor system of claim 12, wherein the coaster assembly includes a swivel to alter a position of the parts delivery device on the coaster assembly.

19. The conveyor system of claim 12, wherein the rail retains multiple coaster assemblies.

20. The conveyor system of claim 12 further comprising hydraulic stoppers positioned along a length of the rail.

* * * * *